United States Patent
Botman et al.

(10) Patent No.: US 11,561,882 B2
(45) Date of Patent: Jan. 24, 2023

(54) APPARATUS AND METHOD FOR GENERATING AND PROCESSING A TRACE STREAM INDICATIVE OF INSTRUCTION EXECUTION BY PROCESSING CIRCUITRY

(71) Applicant: ARM LIMITED, Cambridge (GB)

(72) Inventors: François Christopher Jacques Botman, Cambridge (GB); Thomas Christopher Grocutt, Cambridge (GB); John Michael Horley, Hauxton (GB); Michael John Williams, Ely (GB); Michael John Gibbs, Fulbourn (GB)

(73) Assignee: Arm Limited, Cambridge (GB)

( * ) Notice: Subject to any disclaimer, the term of this patent is extended or adjusted under 35 U.S.C. 154(b) by 375 days.

(21) Appl. No.: 16/332,130

(22) PCT Filed: Aug. 9, 2017

(86) PCT No.: PCT/GB2017/052347
§ 371 (c)(1),
(2) Date: Mar. 11, 2019

(87) PCT Pub. No.: WO2018/051056
PCT Pub. Date: Mar. 22, 2018

(65) Prior Publication Data
US 2019/0370149 A1 Dec. 5, 2019

(30) Foreign Application Priority Data
Sep. 13, 2016 (GB) .................... 1615493

(51) Int. Cl.
*G06F 11/36* (2006.01)
*G06F 9/38* (2018.01)

(52) U.S. Cl.
CPC ........ *G06F 11/3636* (2013.01); *G06F 9/3804* (2013.01)

(58) Field of Classification Search
CPC .......................... G06F 11/3636; G06F 9/3804
(Continued)

(56) References Cited

U.S. PATENT DOCUMENTS 5,822,560 A * 10/1998 Pflum .................. G06F 9/3017
712/214
7,133,969 B2 * 11/2006 Alsup .................. G06F 9/3802
711/125
(Continued)

FOREIGN PATENT DOCUMENTS

CN 101398782 4/2009
CN 101479700 7/2009
(Continued)

OTHER PUBLICATIONS

International Search Report and Written Opinion of the ISA for PCT/GB2017/052347, dated Nov. 13, 2017, 16 pages.
(Continued)

*Primary Examiner* — S. Sough
*Assistant Examiner* — Zengpu Wei
(74) *Attorney, Agent, or Firm* — Nixon & Vanderhye P.C.

(57) ABSTRACT

An apparatus and method are provided for generating and processing a trace stream indicative of instruction execution by processing circuitry. An apparatus has an input interface for receiving instruction execution information from the processing circuitry indicative of a sequence of instructions executed by the processing circuitry, and trace generation circuitry for generating from the instruction execution information a trace stream comprising a plurality of trace elements indicative of execution by the processing circuitry of instruction flow changing instructions within the sequence. The sequence may include a branch behaviour setting instruction that indicates an identified instruction within the sequence, where execution of the branch behaviour setting (Continued)

instruction enables a branch behaviour to be associated with the identified instruction that causes the processing circuitry to branch to a target address identified by the branch behaviour setting instruction when the identified instruction is encountered in the sequence. The trace generation circuitry is further arranged to generate, from the instruction execution information, a trace element indicative of execution behaviour of the branch behaviour setting instruction, and a trace element to indicate that the branch behaviour has been triggered on encountering the identified instruction within the sequence. This enables a very efficient form of trace stream to be used even in situations where the instruction sequence executed by the processing circuitry includes such branch behaviour setting instructions.

25 Claims, 15 Drawing Sheets

(58) Field of Classification Search
USPC .......................................................... 717/128
See application file for complete search history.

(56) References Cited

U.S. PATENT DOCUMENTS

| | | | |
|---|---|---|---|
| 7,562,258 B2 | 7/2009 | Williams et al. | |
| 7,707,394 B2* | 4/2010 | Ashfield | G06F 9/3804 |
| | | | 712/227 |
| 9,104,402 B2* | 8/2015 | Madampath | G06F 9/30058 |
| 2001/0054175 A1 | 12/2001 | Watanabe | |
| 2004/0117172 A1 | 6/2004 | Shibata | |
| 2005/0076180 A1* | 4/2005 | Alsup | G06F 9/3802 |
| | | | 711/125 |
| 2007/0294592 A1* | 12/2007 | Ashfield | G06F 9/3804 |
| | | | 714/45 |
| 2011/0167247 A1 | 7/2011 | Gibbs et al. | |
| 2011/0314342 A1 | 12/2011 | Gilkerson et al. | |
| 2012/0005463 A1 | 1/2012 | Mestan et al. | |
| 2014/0229771 A1 | 8/2014 | Horley et al. | |
| 2015/0058606 A1* | 2/2015 | Madampath | G06F 9/30058 |
| | | | 712/236 |
| 2015/0378728 A1 | 12/2015 | Kumar et al. | |

FOREIGN PATENT DOCUMENTS

| | | |
|---|---|---|
| CN | 102289361 | 12/2011 |
| CN | 102289405 | 12/2011 |
| GB | 2 366 879 | 3/2002 |
| TW | I352927 | 11/2011 |
| TW | I524270 | 3/2016 |

OTHER PUBLICATIONS

Combined Search and Examination Report for GB1615493.2, dated Feb. 28, 2017, 6 pages.
Examination Report for GB Application No. 1615493.2 dated Sep. 9, 2019, 5 pages.
Office Action for EP Application No. 17752459.2 dated Jul. 14, 2020, 5 pages.
Office Action for IL Application No. 264752 dated Jul. 23, 2020 (no English translation available), 3 pages.
Office Action for TW Application No. 106127929 dated Sep. 17, 2021 and English translation, 26 pages.
Office Action for JP Application No. 2019-512749 dated Sep. 17, 2021 and English translation, 5 pages.
Office Action for KR Application No. 10-2019-7009799 dated Nov. 19, 2021 and English translation, 6 pages.
Office Action for TW Application No. 106127929 dated May 4, 2022 and English translation, 11 pages.
Office Action for KR Application No. 10-2019-7009722 dated Aug. 6, 2021 and English translation, 18 pages.
Office Action for IN Application No. 201917013843 dated Aug. 19, 2021, 6 pages.
Office Action for CN Application No. 201710796294.7 dated Nov. 23, 2022, 6 pages.

* cited by examiner

APPARATUS AND METHOD FOR GENERATING AND PROCESSING A TRACE STREAM INDICATIVE OF INSTRUCTION EXECUTION BY PROCESSING CIRCUITRY

This application is the U.S. national phase of International Application No. PCT/GB2017/052347 filed 9 Aug. 2017, which designated the U.S. and claims priority to GB Patent Application No. 1615493.2 filed 13 Sep. 2016, the entire contents of each of which are hereby incorporated by reference.

BACKGROUND

The present technique relates to mechanisms for generating a trace stream indicative of activities of processing circuitry within a data processing system, and in particular to mechanisms for generating and processing a trace stream indicative of instruction execution by such processing circuitry.

Trace circuitry can be used to produce a trace stream comprising a series of trace elements, such that those trace elements can later be analysed in order to determine activities of associated processing circuitry, for example to determine the sequence of instructions executed by the processing circuitry. To reduce the volume of trace information within the trace stream, the trace circuitry may be arranged not to produce a separate trace element for each instruction executed, but instead to only produce trace elements for certain predetermined instructions executed, for example generating a trace element for each branch instruction executed. From the information about the predetermined instructions, analysis circuitry can then seek to use a program image to reconstruct information about the sequence of instructions executed.

Recently, new types of instruction have been proposed, which will be referred to herein as branch behaviour setting instructions. A branch behaviour setting instruction can effectively associate branch behaviour with any arbitrary instruction, in order to cause a branch to be taken when that arbitrary instruction is encountered, either instead of, or in addition to, the normal operation associated with that arbitrary instruction.

This causes significant issues when seeking to trace the execution behaviour of processing circuitry using the trace stream approach described above, where trace elements are only produced for certain predetermined instructions. In particular, whilst the trace mechanism may be arranged to generate trace elements for each branch instruction, the use of the branch behaviour setting instruction enables arbitrary instructions (which the trace mechanism does not recognise as branch instructions) to initiate branches within the instruction flow, which can disrupt the ability of the analysis circuitry to correctly determine the instruction execution behaviour of the processing circuitry from the trace stream produced by the trace circuitry.

The present technique aims to improve reliable tracing in the presence of such branch behaviour setting instructions.

SUMMARY

In one example configuration, there is provided an apparatus comprising: an input interface to receive instruction execution information from processing circuitry indicative of a sequence of instructions executed by the processing circuitry, said sequence including a branch behaviour setting instruction that indicates an identified instruction within said sequence, execution of the branch behaviour setting instruction enabling a branch behaviour to be associated with said identified instruction that causes the processing circuitry to branch to a target address identified by the branch behaviour setting instruction when the identified instruction is encountered in said sequence; and trace generation circuitry to generate from the instruction execution information a trace stream comprising a plurality of trace elements indicative of execution by the processing circuitry of instruction flow changing instructions within said sequence; and the trace generation circuitry further being arranged to generate, from the instruction execution information, a trace element indicative of execution behaviour of said branch behaviour setting instruction, and a trace element to indicate that said branch behaviour has been triggered on encountering said identified instruction within said sequence.

In another example configuration, there is provided an apparatus, comprising: an input interface to receive a trace stream comprising a plurality of trace elements indicative of execution by processing circuitry of predetermined instructions within a sequence of instructions executed by the processing circuitry, said sequence including a branch behaviour setting instruction that indicates an identified instruction within said sequence, execution of the branch behaviour setting instruction enabling a branch behaviour to be associated with said identified instruction that causes the processing circuitry to branch to a target address identified by the branch behaviour setting instruction when the identified instruction is encountered in said sequence; decompression circuitry, responsive to each trace element, to traverse a program image from a current instruction address until a next one of the predetermined instructions is detected within said program image, and to produce from the program image information indicative of the instructions between said current instruction address and said next one of the predetermined instructions; and a branch control storage associated with said decompression circuitry; the decompression circuitry being responsive to detecting at least one type of the branch behaviour setting instruction when traversing said program image in response to a current trace element of a predetermined type, to store within the branch control storage branch control information derived from the branch behaviour setting instruction; the decompression circuitry being arranged, when detecting with reference to the branch control information that the identified instruction has been reached during traversal of the program image, to treat that identified instruction as the next one of said predetermined instructions.

In a yet further example configuration there is provided a method of generating a trace stream indicative of instruction execution by processing circuitry, comprising: receiving instruction execution information from the processing circuitry indicative of a sequence of instructions executed by the processing circuitry, said sequence including a branch behaviour setting instruction that indicates an identified instruction within said sequence, execution of the branch behaviour setting instruction enabling a branch behaviour to be associated with said identified instruction that causes the processing circuitry to branch to a target address identified by the branch behaviour setting instruction when the identified instruction is encountered in said sequence; generating from the instruction execution information the trace stream comprising a plurality of trace elements indicative of execution by the processing circuitry of instruction flow changing instructions within said sequence; and generating, from the instruction execution information, a trace element indicative of execution behaviour of said branch behaviour setting instruction, and a trace element to indicate that said branch behaviour has been triggered on encountering said identified instruction within said sequence.

In a further example configuration there is provided an apparatus comprising: input interface means for receiving instruction execution information from processing circuitry indicative of a sequence of instructions executed by the processing circuitry, said sequence including a branch behaviour setting instruction that indicates an identified instruction within said sequence, execution of the branch behaviour setting instruction enabling a branch behaviour to be associated with said identified instruction that causes the processing circuitry to branch to a target address identified by the branch behaviour setting instruction when the identified instruction is encountered in said sequence; and trace generation means for generating from the instruction execution information a trace stream comprising a plurality of trace elements indicative of execution by the processing circuitry of instruction flow changing instructions within said sequence; and the trace generation means further for generating, from the instruction execution information, a trace element indicative of execution behaviour of said branch behaviour setting instruction, and a trace element to indicate that said branch behaviour has been triggered on encountering said identified instruction within said sequence.

In accordance with another example configuration there is provided a method of processing a trace stream generated to indicate instruction execution by processing circuitry, comprising: receiving the trace stream comprising a plurality of trace elements indicative of execution by the processing circuitry of predetermined instructions within a sequence of instructions executed by the processing circuitry, said sequence including a branch behaviour setting instruction that indicates an identified instruction within said sequence, execution of the branch behaviour setting instruction enabling a branch behaviour to be associated with said identified instruction that causes the processing circuitry to branch to a target address identified by the branch behaviour setting instruction when the identified instruction is encountered in said sequence; traversing, responsive to each trace element, a program image from a current instruction address until a next one of the predetermined instructions is detected within said program image, and producing from the program image information indicative of the instructions between said current instruction address and said next one of the predetermined instructions; responsive to detecting at least one type of the branch behaviour setting instruction when traversing said program image in response to a current trace element of a predetermined type, storing within a branch control storage branch control information derived from the branch behaviour setting instruction; and when detecting with reference to the branch control information that the identified instruction has been reached during traversal of the program image, treating that identified instruction as the next one of said predetermined instructions.

In a still further example configuration there is provided an apparatus, comprising: an input interface means for receiving a trace stream comprising a plurality of trace elements indicative of execution by processing circuitry of predetermined instructions within a sequence of instructions executed by the processing circuitry, said sequence including a branch behaviour setting instruction that indicates an identified instruction within said sequence, execution of the branch behaviour setting instruction enabling a branch behaviour to be associated with said identified instruction that causes the processing circuitry to branch to a target address identified by the branch behaviour setting instruction when the identified instruction is encountered in said sequence; decompression means for traversing, responsive to each trace element, a program image from a current instruction address until a next one of the predetermined instructions is detected within said program image, and for producing from the program image information indicative of the instructions between said current instruction address and said next one of the predetermined instructions; and a branch control storage means for association with said decompression means; the decompression means, responsive to detecting at least one type of the branch behaviour setting instruction when traversing said program image in response to a current trace element of a predetermined type, for storing within the branch control storage means branch control information derived from the branch behaviour setting instruction; the decompression means, when detecting with reference to the branch control information that the identified instruction has been reached during traversal of the program image, for treating that identified instruction as the next one of said predetermined instructions.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
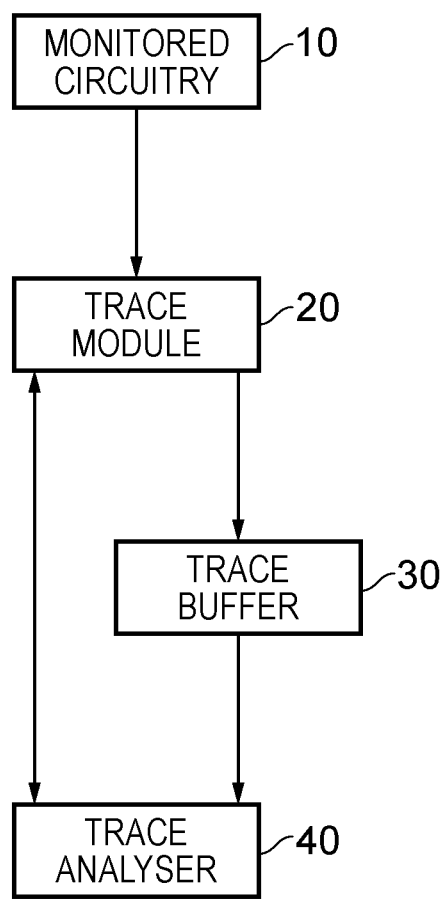
FIG. 1 is a block diagram of a system in accordance with one embodiment.

Tracing the activity of processing circuitry within a data processing system, whereby a stream of trace elements is generated which can then be analysed to identify the step-by-step activity of the processing circuitry is a highly useful tool in system software development. The trace stream may for example be analysed in order to facilitate debugging of sequences of instructions being executed by the processing circuitry. Typically, the tracing mechanism are provided on-chip with the processing circuitry, an example of such an on-chip tracing mechanism being the Embedded Trace Macrocell (ETM) provided by ARM Limited, Cambridge, England in association with a variety of ARM processors. Such tracing mechanisms can potentially produce a large volume of trace elements that then need to be provided off-chip for further analysis. A number of techniques have been developed to seek to reduce the amount of trace information produced, whilst still enabling later analysis of the step-by-step activity of the processing circuitry.

As mentioned earlier, one technique for reducing the volume of trace information produced involves only outputting trace elements for particular types of instructions within the instruction sequence executed by the processing circuitry, with the trace analysis circuitry then being able to reconstruct the step-by-step instruction execution behaviour of the processing circuitry from information about the execution of those particular instructions. As an example, the trace circuitry may output a trace element each time an instruction flow changing instruction (typically a branch instruction) is processed, indicating whether that branch has been taken or not taken, and the analysis circuitry can then deduce what instructions have been executed by the processing circuitry between those instructions for which a trace element has been produced.

However, the earlier-mentioned branch behaviour setting instructions may appear within the instruction sequence. Execution of a branch behaviour setting instruction enables a branch behaviour to be associated with another instruction identified by the branch behaviour setting instruction (referred to as the "identified instruction" herein) that causes the processing circuitry to branch to a target address identified by the branch behaviour setting instruction when the identified instruction is encountered in the sequence of instructions. Hence, the branch behaviour setting instruction can effectively change any arbitrary instruction into a branch.

As mentioned earlier, this causes significant issues when seeking to trace the execution behaviour of processing circuitry using the trace stream approach described above, where trace elements are only produced for certain predetermined instructions. The described embodiments aim to alleviate these problems, allowing the reduced volume trace stream approach mentioned above to continue to be adopted whilst also accommodating instruction sequences including branch behaviour setting instructions.

Before discussing the embodiments with reference to the accompanying figures, the following description of embodiments is provided.

In one embodiment an apparatus is provided that comprises an input interface to receive instruction execution information from associated processing circuitry that is indicative of a sequence of the instructions executed by the processing circuitry, and trace generation circuitry to generate from the instruction execution information a trace stream comprising a plurality of trace elements indicative of execution by the processing circuitry of instruction flow changing instructions within that sequence. The sequence of instructions may include a branch behaviour setting instruction that indicates an identified instruction within the sequence. Execution of the branch behaviour setting instruction enables a branch behaviour to be associated with the identified instruction that causes the processing circuitry to branch to a target address identified by the branch behaviour setting instruction when the identified instruction is encountered in the sequence.

Further, the trace generation circuitry is arranged to generate, from the instruction execution information, a trace element indicative of execution behaviour of the branch behaviour setting instruction, and a trace element to indicate that said branch behaviour has been triggered on encountering the identified instruction within the sequence. With these additional trace elements within the trace stream, this provides an efficient mechanism for a trace analyser that subsequently receives the trace stream to determine the sequence of instructions executed by the processing circuitry. In particular, when provided with this additional information within the trace stream, the trace analyser can determine when execution of a branch behaviour setting instruction has caused the branch behaviour to be associated with the identified instruction, and hence it is possible to correctly interpret the sequence of trace elements in order to determine each point at which a change in instruction flow occurs within the sequence of instructions.

In one embodiment, when execution of the branch behaviour setting instruction causes the branch behaviour to be associated with the identified instruction, the processing circuitry is arranged to store branch control information for that identified instruction within a branch control storage. The trace generation circuitry is then arranged to generate a trace element indicating that said branch behaviour has been triggered when the instruction execution information indicates that a branch has occurred due to the identified instruction being encountered in the sequence at a time where branch control information for that identified instruction is stored within the branch control storage. Hence, if associated branch control information for the identified instruction is still present within the branch control storage at the time the identified instruction is encountered, and that does result in a branch occurring, the trace generation circuitry can generate a trace element to indicate that the branch behaviour has been triggered, allowing a trace analyser to later determine the change in the instruction flow that has occurred on encountering the identified instruction.

In one embodiment, if at the time the identified instruction is encountered, there is no longer any corresponding branch control information within the branch control storage, this will mean that the branch behaviour is not triggered within the processing circuitry, and accordingly the trace generation circuitry will not generate a trace element indicating that the branch behaviour has been triggered. In some embodiments, dependent on the type of branch behaviour setting instruction, the trace generation circuitry may be arranged to issue one or more additional packets within the trace stream when contents of the branch control storage get invalidated, so as to enable the trace analyser to correctly track the activities of the processing circuitry in such situations.

The branch behaviour setting instruction can take a variety of forms. In one embodiment, the branch behaviour setting instruction is a loop-end instruction at a finish of a program loop body, the identified instruction is an immediately preceding instruction within said program loop body, and said target address is an address of an instruction at a start of the program loop body. The trace generation unit is then arranged to issue a trace element indicating that said branch behaviour has been triggered each time the instruction execution information indicates that a branch has occurred due to said immediately preceding instruction being encountered at a time where branch control information for said immediately preceding instruction is stored within the branch control storage.

Such a loop-end instruction can be used to implement a so-called "zero overhead loop", where the loop-end instruction does not need to be executed during each iteration of the loop, and instead, following the first iteration, the required branching for further iterations can be triggered when encountering the penultimate instruction in the program loop body. By causing the trace generation unit to generate trace elements in the manner described above, this enables an analysis circuitry to correctly track the processing circuitry's execution of such a zero-overhead loop.

In one embodiment, the branch behaviour will not always be triggered merely due to the immediately preceding instruction being encountered at a time where branch control information for that immediately preceding instruction is stored within the branch control storage. Instead, in addition it will also be necessary to determine at that point that at least one further iteration of the program loop body is required, and only then will the branch behaviour be triggered. Accordingly, only under such a condition will the trace generation unit issue a trace element indicating that the branch behaviour has been triggered. In one embodiment, if the branch behaviour is not triggered in that instance, then no trace element needs to be issued at that point in time by the trace generation unit.

In one embodiment, execution of the loop-end instruction will not always cause the branch behaviour to be associated with the immediately preceding instruction. When execution of the loop-end instruction does cause the branch behaviour to be associated with said immediately preceding instruction, the processing circuitry is arranged to branch to said target address, and the trace generation circuitry is arranged to issue a trace element indicating a taken branch as the execution behaviour of said loop-end instruction. Conversely, when no further iterations of the loop body are required, execution of the loop-end instruction will cause the processing circuitry to exit the program loop body, and the trace generation circuitry is arranged to issue a trace element indicating a not taken branch as the execution behaviour of said loop-end instruction.

In one embodiment, trace elements in the form of atoms can be used for this purpose, and when execution of the loop end instruction causes the branch behaviour to be associated with the immediately preceding instruction, an E atom may be issued in association with execution of that loop-end instruction, whereas otherwise an N atom may be associated with execution of the loop-end instruction.

In one embodiment, when an event causes the branch control information for said immediately preceding instruction to be invalidated within the branch control storage whilst further iterations of the program loop body are still required, the branch behaviour will not be triggered on a next encountering of said immediately preceding instruction. However, the processing circuitry is responsive to a next execution of the loop-end instruction to cause the branch behaviour to be re-associated with said immediately preceding instruction, and a branch to be taken to said target address, thereby resuming processing of the further iterations of the program loop body. The trace generation circuitry is then arranged to issue a further trace element indicating a taken branch as the execution behaviour of said loop-end instruction.

Hence, in such embodiments, invalidation of the branch control storage contents while one or more remaining iterations of the program loop body are still required does not cause any problems from a tracing perspective, since the subsequent execution of the loop-end instruction will cause the branch behaviour to be re-associated with the immediately preceding instruction. Whilst the trace analyser cannot in this instance distinguish between a taken branch on encountering the immediately preceding instruction within the loop body, or a taken branch due to re-execution of the loop-end instruction, this does not matter, as the trace analyser will still correctly track the execution of each iteration of the program loop body from the trace elements that are issued.

Another type of branch behaviour setting instruction that may be supported by the described embodiments is a branch-future instruction. The instruction sequence may include only branch behaviour setting instructions in the form of the earlier-mentioned loop-end instructions, only branch behaviour setting instructions in the form of branch-future instructions, or may have a mixture of both loop-end instructions and branch-future instructions within the instruction sequence.

When the branch behaviour setting instruction is a branch-future instruction, the identified instruction is an instruction following the branch-future instruction within the sequence. Any arbitrary instruction can be specified by the branch-future instruction as the identified instruction. In such an embodiment, when execution of the branch-future instruction causes the branch behaviour to be associated with said identified instruction, the trace generation circuitry is arranged to issue a trace element indicating, as the execution behaviour of said branch-future instruction, that the branch behaviour has been associated. Conversely, when execution of the branch-future instruction does not cause the branch behaviour to be associated with said identified instruction, the trace generation circuitry is arranged to issue a trace element indicating, as the execution behaviour of said branch-future instruction, that the branch behaviour has not been associated. By such an approach, the execution behaviour of each branch-future instruction can be captured within the trace stream, hence enabling the trace analyser to determine whether execution of a branch-future instruction has caused the branch behaviour to be associated with the identified instruction or not.

There are a number of reasons why execution of the branch-future instruction may not cause the branch behaviour to be associated with the identified instruction. For example, the branch-future instruction may be arranged to be conditional, so that only if certain conditions are met will the branch behaviour be associated with the identified instruction. Furthermore, in some embodiments, it may be possible to selectively disable the branch-future functionality, as a result of which any encountered branch-future instruction will not cause the branch behaviour to be associated with the identified instruction.

The form of trace element issued by the trace generation circuitry to identify the execution behaviour of the branch-future instruction can take a variety of forms. However, in one embodiment the trace elements used to indicate taken and non-taken branches are reused for this purpose. In particular, in one embodiment the trace generation circuitry is arranged to issue, as the trace element indicating that the branch behaviour has been associated, a same type of trace element as used to indicate a taken branch, and the trace generation circuitry is arranged to issue, as the trace element indicating that the branch behaviour has not been associated, a same type of trace element as used to indicate a not taken branch. Hence, in one particular embodiment, the earlier-mentioned E and N atoms can be used for this purpose.

In one embodiment, it is possible for execution of one branch-future instruction to cause an active entry in the branch control storage associated with an earlier branch-future instruction to be overwritten. In such circumstances, the trace generation circuitry can be arranged to issue a further trace element to identify that fact to the trace analysis circuitry. In particular, in one embodiment, when execution of the branch-future instruction causes the branch behaviour to be associated with the identified instruction, and the branch control information for that identified instruction stored by the processing circuitry within the branch control storage overwrites active branch control information associated with the identified instruction of a previously executed branch-future instruction, the trace generation circuitry is arranged to issue a non-event trace element. The trace analyser can then be arranged to be responsive to the non-event trace element to update its internally maintained records so as to identify that no branch will occur in association with the identified instruction of that earlier branch-future instruction. In one embodiment the non-event trace element is issued in the trace stream prior to the trace element that is issued to indicate that execution of the branch-future instruction has caused the branch behaviour to be associated with the identified instruction.

In one embodiment, if the replacement policy used within the branch control storage is known to the trace analyser, and it is deterministic from the other trace elements in the trace stream that an entry will have been overwritten, there may be no need to separately issue a non-event trace element within the trace stream.

In one embodiment, when tracing is enabled at a point in instruction execution between execution of the branch-future instruction and encountering of the identified instruction in said sequence, the trace generation circuitry is responsive to a branch being taken on encountering the identified instruction, to issue a trace element to identify both the identified instruction and the branch that has been taken on encountering that identified instruction.

This special form of trace element hence needs to capture more information than the earlier-mentioned trace element issued when encountering the identified instruction when tracing has been enabled early enough that the execution behaviour of the preceding branch-future instruction will also have been traced, since it is necessary to provide sufficient information within the trace element to both clearly identify the identified instruction, and to fully identify the branch that has been taken on encountering that identified instruction. Hence, in one embodiment that trace element will need to identify the address of the identified instruction, and the target address. Whilst this is relatively expensive in terms of trace bandwidth, it will be appreciated that the use of such a trace element is unlikely to be required very often, since in most instances it is expected that tracing will not be enabled at a point in time between execution of the branch-future instruction and encountering of the associated identified instruction in the sequence. In one embodiment, a pre-existing type of trace element format can be used for this special trace element, namely a format of trace element already used for providing information about exceptions that occur during instruction execution.

There are a number of ways in which the trace generation circuitry can determine a situation where tracing has been enabled at a point in instruction execution between execution of the branch-future instruction and encountering of the identified instruction. In one embodiment, the trace generation circuitry is arranged to maintain a counter value in association with each entry in the branch control storage associated with an identified instruction of a branch-future instruction, and the trace generation circuitry is arranged to issue said trace element to identify both the identified instruction and the branch that has been taken on encountering that identified instruction, when the counter value for the relevant entry in the branch control storage has an unexpected value when the branch is taken on encountering the identified instruction.

In one particular embodiment, the counter may be incremented when the trace generation circuitry issues a trace element for the branch-future instruction to indicate that the branch behaviour has been associated with the identified instruction (in one embodiment by issuing an E atom), and may be decremented when it is detected that a branch has subsequently been taken for the identified instruction. Hence, it would be expected that the value of the counter would be non-zero at the point the branch is taken on encountering an identified instruction, and if it is instead zero, this in one embodiment is used to indicate that the earlier-mentioned exception-style packet should instead be issued by the trace generation circuitry.

In one embodiment, various events may cause the branch control information within the branch control storage to be invalidated. For example, in one embodiment, when an exception is taken by the processing circuitry, the current contents of the branch control storage are invalidated. The trace generation circuitry may be arranged in such a situation to issue an invalidation trace element within the trace stream, to enable the trace analyser to subsequently determine when the branch control storage contents have been invalidated. However, in other embodiments there may be no need to issue a special invalidation trace element, since the trace analyser may be able to determine that the branch control storage contents have been invalidated from other packets issued within the trace stream. For example, another packet may be issued at the time the branch control storage contents are invalidated, for other reasons, and the trace analyser may be able to determine from that packet that the contents of the branch control storage have been invalidated. As a particular example, an interrupt packet may be issued on encountering an interrupt, and the trace analyser may be arranged to determine from the presence of the interrupt packet that the branch control storage contents will have been invalidated.

When the branch behaviour is triggered on encountering the identified instruction within the sequence, the processing circuitry may in one embodiment be arranged to still execute the identified instruction, in addition to triggering the branch behaviour, whilst in an alternative embodiment it may merely trigger the branch behaviour but inhibit execution of the identified instruction itself. Hence, in that latter case, the branch behaviour effectively replaces the normal execution behaviour of the identified instruction.

The branch control information stored within the branch control storage can take a variety of forms, but in one embodiment comprises at least branch point data providing an indication of the identified instruction, and further data providing an indication of the target address. The branch point data can take a variety of forms, but is sufficient to enable the identified instruction to be determined, and hence to detect when that identified instruction has been encountered by the processing circuitry.

In one embodiment, the branch point data may comprise one or more of: address data indicative of an address of said identified instruction; end data indicative of an address of a last instruction that immediately precedes said identified instruction; offset data indicative of a distance between said branch behavior setting instruction and said identified instruction; a proper subset of bits indicative of a memory storage address of said identified instruction starting from a least significant bit end of bits of said memory storage address that distinguish between starting storage addresses of instructions; remaining size instruction data indicative of a number of instructions remaining to be processed before said identified instruction; and remaining size data indicative of a number of program storage locations remaining to be processed before said identified instruction is reached.

It will be appreciated that these various options provide mechanisms for determining when the identified instruction has been reached within the instruction sequence.

In a further embodiment, an apparatus may be provided for performing trace analysing functions. In particular, such an apparatus may comprise an input interface to receive a trace stream comprising a plurality of trace elements indicative of execution by processing circuitry of predetermined instructions within a sequence of instructions executed by the processing circuitry, said sequence including a branch behaviour setting instruction that indicates an identified instruction within said sequence, execution of the branch behaviour setting instruction enabling a branch behaviour to be associated with said identified instruction that causes the processing circuitry to branch to a target address identified by the branch behaviour setting instruction when the identified instruction is encountered in said sequence. The apparatus further comprises decompression circuitry, responsive to each trace element, to traverse a program image from a current instruction address until a next one of the predetermined instructions is detected within said program image, and to produce from the program image information indicative of the instructions between said current instruction address and said next one of the predetermined instructions. Branch control storage is associated with said decompression circuitry. The decompression circuitry is responsive to detecting at least one type of the branch behaviour setting instruction when traversing said program image in response to a current trace element of a predetermined type, to store within the branch control storage branch control information derived from the branch behaviour setting instruction. Further, the decompression circuitry is arranged, when detecting with reference to the branch control information that the identified instruction has been reached during traversal of the program image, to treat that identified instruction as the next one of said predetermined instructions.

Hence, considering the example where the predetermined instructions are branch instructions, then even though the branch behaviour setting instruction may not itself be a branch instruction, and indeed the identified instruction may not itself be a branch instruction, through use of the branch control storage in association with the decompression circuitry, the decompression circuitry can detect when the processing circuitry has associated the branch behaviour with the identified instruction, and can detect when that identified instruction is encountered within the program image. At that point it can then treat the identified instruction as if it were a branch instruction. This hence allows the generation of a trace stream that only produces trace elements for certain instructions executed by the processing circuitry to be correctly analysed by the trace analysing circuitry, even when the instruction sequence being executed includes one or more branch behaviour setting instructions, and hence can potentially turn any arbitrary instruction into a branch.

Whilst the decompression circuitry may be arranged to make an entry in its associated branch control storage for each branch behaviour setting instruction encountered when traversing the program image, in one embodiment it only does this for branch-future instructions, but not for the earlier-mentioned loop-end instructions. In particular, in one embodiment the decompression circuitry does not need to distinguish between the loop-end instruction and the identified instruction specified by that loop-end instruction (i.e. the immediately preceding instruction within the program loop body) in order to correctly track the instruction execution behaviour of the processing circuitry, and hence there is no need to make an entry in the decompression circuitry's associated branch control storage for the identified instruction.

The information stored within the branch control storage associated with the decompression circuitry can take a variety of forms. In one embodiment, the decompression circuitry is arranged to store, as the branch control information, branch point data identified by the branch behaviour setting instruction and used to determine the identified instruction. Furthermore in one embodiment the decompression circuitry is arranged to store as the branch control information the target address when that target address is directly derivable from an immediate value specified within the branch behaviour setting instruction. Hence, if that target address is directly derivable from an immediate value, the decompression circuitry can determine the target address from the program image, and hence capture the target address within its local branch control storage. This enables it to directly determine where to branch to within a program image when the identified instruction is later encountered. If instead the target address is not directly identifiable, then in one embodiment the trace stream will include information directly identifying the target address, and hence it is possible for the decompression circuitry to determine the target address from the information provided within the trace stream.

In one embodiment, the decompression circuitry can also be arranged to be responsive to the earlier-mentioned non-event trace elements or invalidation trace elements where those trace elements are optionally used. In particular, the decompression circuitry may be arranged to be responsive a non-event trace element in the trace stream to invalidate a particular entry in its associated branch control storage. Similarly, in response to an invalidation trace element, the decompression circuitry may be arranged to invalidate the contents of its associated branch control storage.

Particular embodiments will now be described with reference to the Figures.

FIG. 1 schematically illustrates a system in accordance with one embodiment, providing monitored circuitry 10, a trace module 20, a trace buffer 30 and a trace analyser 40. Whilst FIG. 1 illustrates a system providing a trace buffer 30, in alternative embodiments the trace module 20 may pass its output directly to the trace analyser 40, without going via a trace buffer. The trace module 20 is arranged to produce a trace stream comprising a series of trace elements, which then enables the trace analyser to reconstruct the activities of the monitored circuitry 10. The monitored circuitry 10 can take a variety of forms, but in one embodiment includes at least one processing element, for example a processor core, that is arranged to execute a sequence of instructions. The monitored circuitry outputs instruction execution information to the trace module 20 indicative of the instructions being executed on the monitored circuitry.

The trace module, which in one embodiment is embodied on-chip, and may for example take the form of an ETM circuit produced by ARM Limited, Cambridge, United Kingdom, is arranged to produce a trace stream providing a series of trace elements, where the trace elements are indicative of execution of predetermined instructions within the instruction sequence. Hence, rather than producing a trace element representative of each instruction that is executed by the monitored circuitry, the trace elements within the trace stream only indicate the execution of certain predetermined instructions, with the trace analyser being provided with sufficient knowledge (e.g. via a program image) to enable it to reconstruct information about the instructions that have been executed between each such predetermined instruction for which a trace element is provided. For example, in one embodiment the trace module may be arranged to generate a trace element for every instruction flow changing instruction (typically a branch instruction) that is executed within the sequence, that trace element providing information about whether the branch was taken or not taken, and the trace analyser 40 is provided with a program image to enable it to determine, based on the information about the processing of the branch instructions, the actual sequence of instructions that has been executed. This enables a significantly reduced volume of trace elements to be produced. This is very useful, as the trace analyser 40 is typically embodied off-chip, and hence the trace stream needs to be routed via pins of the chip to the analyser.

The instruction sequence executed by the monitored circuitry may include one or more branch behaviour setting instructions. A branch behaviour setting instruction is able to associate a branch behaviour with an arbitrary instruction identified explicitly or implicitly by the branch behaviour setting instruction, and when that identified instruction is then later encountered, this may cause the monitored circuit to take a branch to a target address that is identified by the branch behaviour setting instruction (instead of, or in addition to, performing the function required by the identified instruction). To support this behaviour, the monitored circuitry may have an associated branch control storage, in one embodiment this taking the form of a branch target address cache (BTAC) having one or more entries.

When a branch behaviour setting instruction is executed, this may cause an entry to be allocated in the BTAC (depending on the type of branch behaviour setting instruction, an evaluation may take place to determine whether an entry should be allocated), and that entry records as a source address the address of the identified instruction that is indicated by the branch-future instruction, along with a target address identifying the address to which the processing circuitry should branch when that identified instruction is encountered. In one embodiment, following an execution of the branch behaviour setting instruction that causes population of the BTAC in the above manner, when the processing circuitry then detects a hit in one of the entries of its BTAC, due for example to detecting that its program counter has been updated to, or is about to be updated to, a value corresponding to the source address held in one of the entries of the BTAC, it can be arranged to cause the instruction flow to branch to the target address also captured in that entry of the BTAC (as will be discussed in more detail later, depending on the type of branch behaviour setting instruction, taking of the branch can be made conditional on another condition also being present).

By such an approach, it can be seen that a branch behaviour setting instruction can be used to effectively turn any arbitrary instruction into a branch. The form of that identified instruction does not matter, since when identified by the branch behaviour setting instruction in the manner described above, the processing circuitry can be arranged, on subsequently encountering that identified instruction, to perform the branch identified by the branch behaviour setting instruction. Branch behaviour setting instructions can be executed conditionally if desired. Hence, when the conditions for execution of the branch behaviour setting instruction are met, the above discussed processing will occur, and when the identified instruction is subsequently encountered the monitored circuitry may perform the branch to the target address (in addition to, or instead of, executing the identified instruction). Conversely, if the conditions are not met at the time the branch behaviour setting instruction is to be executed, the branch behaviour setting instruction will not be executed, and in due course the identified instruction will be executed in its normal manner to perform the functions specified by that identified instruction.

Whilst the use of such branch behaviour setting instructions adds significant flexibility into the operations that may be performed by the monitored circuitry 10, it causes significant issues for the trace module 20 when the trace module is arranged to produce a trace stream of the earlier-mentioned type, where trace elements are only produced for particular predetermined instructions within the sequence being executed by the monitored circuitry. In particular, if the trace module is set up to produce trace elements for each instruction flow changing instruction executed, it would not typically produce a trace element for an identified instruction that has been flagged by the branch behaviour setting instruction as causing a branch, since that identified instruction may well itself not be a branch instruction. If the trace stream does not correctly flag that such a branch has occurred, it will be appreciated that the trace analyser will not be able to correctly deduce the sequence of instructions executed by the monitored circuitry.

It may be possible to arrange the trace generation circuitry to trace any such branch that occurred as a result of reaching an identified instruction flagged by an entry in the monitored circuit's BTAC in the same way as it might trace information about when an exception has occurred. However, this would be expensive in terms of trace bandwidth as it would be necessary to trace both the address of the identified instruction and the target address that was branched to, and hence this could significantly compromise the efficiency of the trace stream format.

As will be discussed further therein, a mechanism is provided to enable the trace generation circuitry to efficiently trace branches that take place within the monitored circuitry due to identified instructions being encountered that match entries in the monitored circuit's BTAC, due to previous execution of branch behaviour setting instructions.

Figure 2:
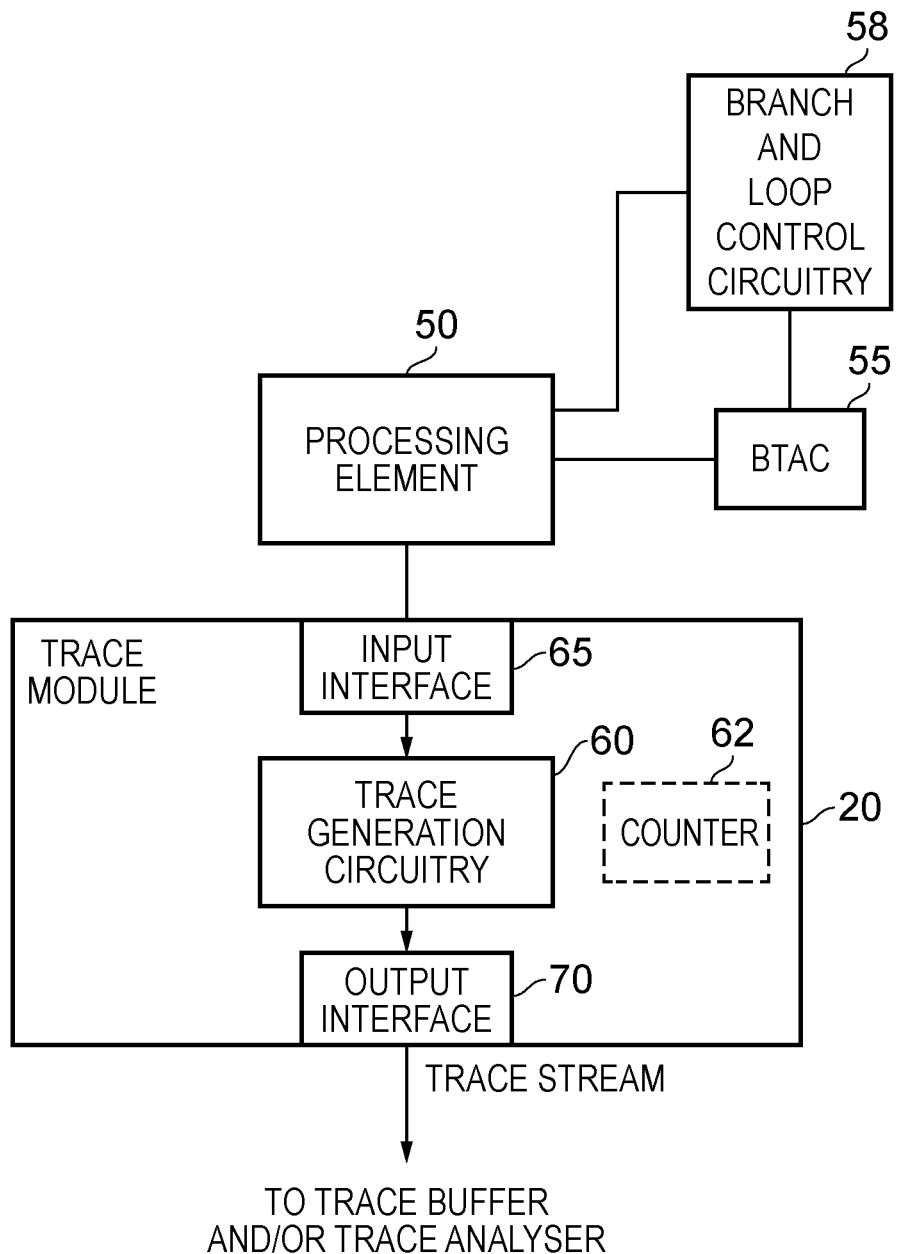
FIG. 2 is a block diagram illustrating in more detail a trace module used in accordance with one embodiment.

FIG. 2 is a block diagram illustrating the trace module 20 of one embodiment. As shown, the trace module 20 is coupled to a processing element 50, which in one embodiment forms at least part of the monitored circuitry 10. The processing element 50 has an associated BTAC 55 that maintains branch control information that is populated based on execution of branch behaviour setting instructions. The BTAC 55 has one or more entries, and when the processing element 50 executes a branch behaviour setting instruction, one of the entries in the BTAC 55 will be populated with certain branch control information provided execution of the branch behaviour setting instruction indicates that the earlier-mentioned branch behaviour should be associated with the identified instruction.

Figure 4A:
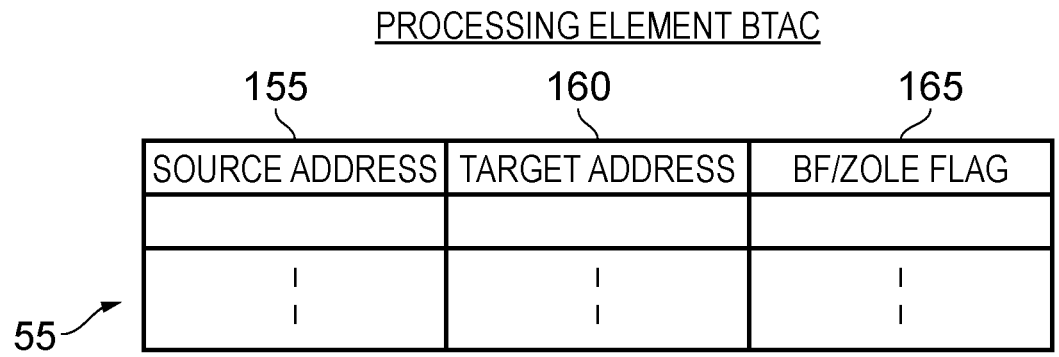
FIGS. 4A and 4B schematically illustrate different forms of branch target address cache (BTAC) that may be used within the system of FIG. 1 in accordance with one embodiment.

In one embodiment as shown in FIG. 4A, each entry within the BTAC 55 may include a source address field 155 in which the address of the identified instruction indicated by the branch behaviour setting instruction is captured, and a target address field 160 in which the target address identified by the branch behaviour setting instruction is stored. Whilst, in one embodiment, a field 155 stores the address of the identified instruction, more generally the field 155 stores branch point data which can take any of the forms discussed earlier, but is sufficient to enable the processing element to detect when it has encountered within the instruction stream the identified instruction. When a hit is detected in one of the entries of the BTAC 55, indicating that an identified instruction has been encountered within the instruction stream, then assuming any other required condition is met the processing element branches to the target address in the associated target address field 160 (in addition to, or instead of, executing the identified instruction).

In one embodiment, more than one type of branch behaviour setting instruction may be supported, with a field 165 being provided within each BTAC entry 55 to identify the type of branch behaviour setting instruction with which that entry is associated. Branch and loop control circuitry 58 can then be provided to reference that field 165 for a particular entry for which a hit has been detected in the BTAC in order to determine whether the branch behaviour should be invoked.

In one embodiment, a first type of branch behaviour setting instruction is supported, which will be referred to herein as a branch-future instruction. When executing the branch-future instruction, the identified instruction may be any arbitrary instruction that the processing circuitry will encounter within the instruction sequence at some point after executing the branch-future instruction. Execution of the branch-future instruction can be made conditional, and indeed for backwards compatibility reasons in some embodiments it may be possible to disable the branch-future functionality. However, assuming the branch-future instruction is executed then one of the entries in the BTAC 55 will be populated as discussed above. Subsequently, when the identified instruction is encountered within the instruction stream, then provided the corresponding entry in the BTAC 55 is still present, this will cause the branch and loop control circuitry 58 to determine that the branch behaviour should be invoked, and as a result the processing element 50 will branch to the target address identified in that entry of the BTAC 55. At this point, the branch and loop control circuitry 58 can then invalidate that BTAC entry.

A second type of branch behaviour setting instruction that may be supported in one embodiment is a zero overhead loop end (ZOLE) instruction that is used as a final instruction in a program loop. It can be arranged to identify as the identified instruction the immediately preceding instruction in the loop, and to identify as the target address an address indication of the start location of the program loop. On a first iteration, the ZOLE instruction can be arranged to populate an entry in the BTAC 55 provided that at least one further iteration of the program loop is required, and then to branch to the start location of the program loop. On each subsequent iteration, when the identified instruction (i.e. the penultimate instruction of the program loop) is encountered, then provided the corresponding entry is still present in the BTAC 55, and provided that there is still at least one further iteration of the program loop to perform, the branch and loop control circuitry 58 will determine that the above-mentioned branch behaviour should be invoked, causing the processing element 50 to branch to the start location of the program loop, in addition to executing that penultimate instruction. This can significantly increase performance of the execution of program loops. In due course, when the identified instruction is encountered during a final iteration of the loop, then if the relevant BTAC entry is still populated, the branch and loop control circuitry 58 can decide to invalidate that BTAC entry and not invoke the branch behaviour.

As the processing element 50 executes the sequence of instructions, it passes instruction execution information to the input interface 65 of the trace module 20, from where it is forwarded to the trace generation circuitry 60. In one embodiment, this instruction execution information will include information identifying execution behaviour of a branch behaviour setting instruction (sufficient to determine whether execution of that instruction has led to an entry being made in the BTAC 55), and will include information identifying when a branch has occurred due to a hit in one of the BTAC entries.

In one embodiment, each entry in the BTAC 55 may have an additional field to capture information about whether the target address is a direct target address, i.e. is directly determinable from the branch behaviour setting instruction (for example by being provided as an immediate value within the branch behaviour setting instruction), or is an indirect target address, for example where the branch behaviour setting instruction identifies a register whose contents are used to derive the target address, and this information can be provided within the instruction execution information provided by the processing element 50 to the trace generation circuitry 60, for use by the trace generation circuitry 60 when deciding what information to include within the trace stream when a branch occurs that is due to a hit within the BTEC 55.

In one embodiment, the trace generation circuitry 60 is arranged to output a trace element within its trace stream whenever a branch instruction is executed within the instruction sequence, that trace element also indicating whether the branch was taken or not taken, this being derivable from the instruction execution information received from the processing element 50 via the input interface 65. The stream of trace elements is then forwarded via the output interface 70 for onward propagation to the trace buffer 30 and/or the trace analyser 40. Each such trace element may also be referred to herein as an "atom", an "E atom" indicating that the branch has been taken, and an "N atom" indicating that the branch has not been taken.

Further, the trace generation circuitry 60 is arranged to issue a trace element indicative of the execution behaviour of each branch behaviour setting instruction. An aim of such a trace element is to provide sufficient information for the analysis circuitry 40 to determine whether execution of that branch behaviour setting instruction has caused an entry to be populated within the BTAC 55. Considering the earlier example of a ZOLE instruction, this is in fact a branch instruction itself, and if the branch is taken to return processing to the start of the program loop, this will indicate a situation where execution of the ZOLE instruction has caused an entry in the BTAC 55 to be made. Conversely, if the branch is not taken, no entry will be made in the BTAC 55. Hence, it is merely sufficient in that instance to issue an E or an N atom dependent on the branch behaviour of the ZOLE instruction.

For a branch-future instruction, in one embodiment this is not itself a branch instruction, but the trace mechanism can be arranged so that an E atom is issued by the trace generation circuitry 60 if execution of the branch-future instruction causes an entry to be successfully registered in the BTAC 55, and an N atom to be issued otherwise.

In addition, the trace generation circuitry 60 is arranged to detect based on the instruction execution information when a branch has occurred due to a hit in the processing element's BTAC 55. In that instance, the trace generation circuitry also issues within the trace stream a trace element to indicate that a branch to the target address has occurred (in one embodiment by issuing an E atom). The target address itself does not need to be identified within the trace stream if it is directly deducible from the branch behaviour setting instruction, since the trace analyser 40 will then be able to determine the target address. However, if the target address is not directly deducible, then the trace generation circuitry 60 will determine the target address from the information provided by the processing element 50, and will output the target address within the trace stream, so that that target address can then be used by the trace analyser 40.

As will be discussed in more detail later with reference to FIG. 15, in one embodiment the trace module 20 can be provided with a counter circuit 62 for maintaining a saturating counter for each entry in the BTAC 55, which can be used to detect situations where trace has been enabled between a point in time where a branch-future instruction is executed, and the corresponding identified instruction is encountered in the instruction sequence.

Figure 3:
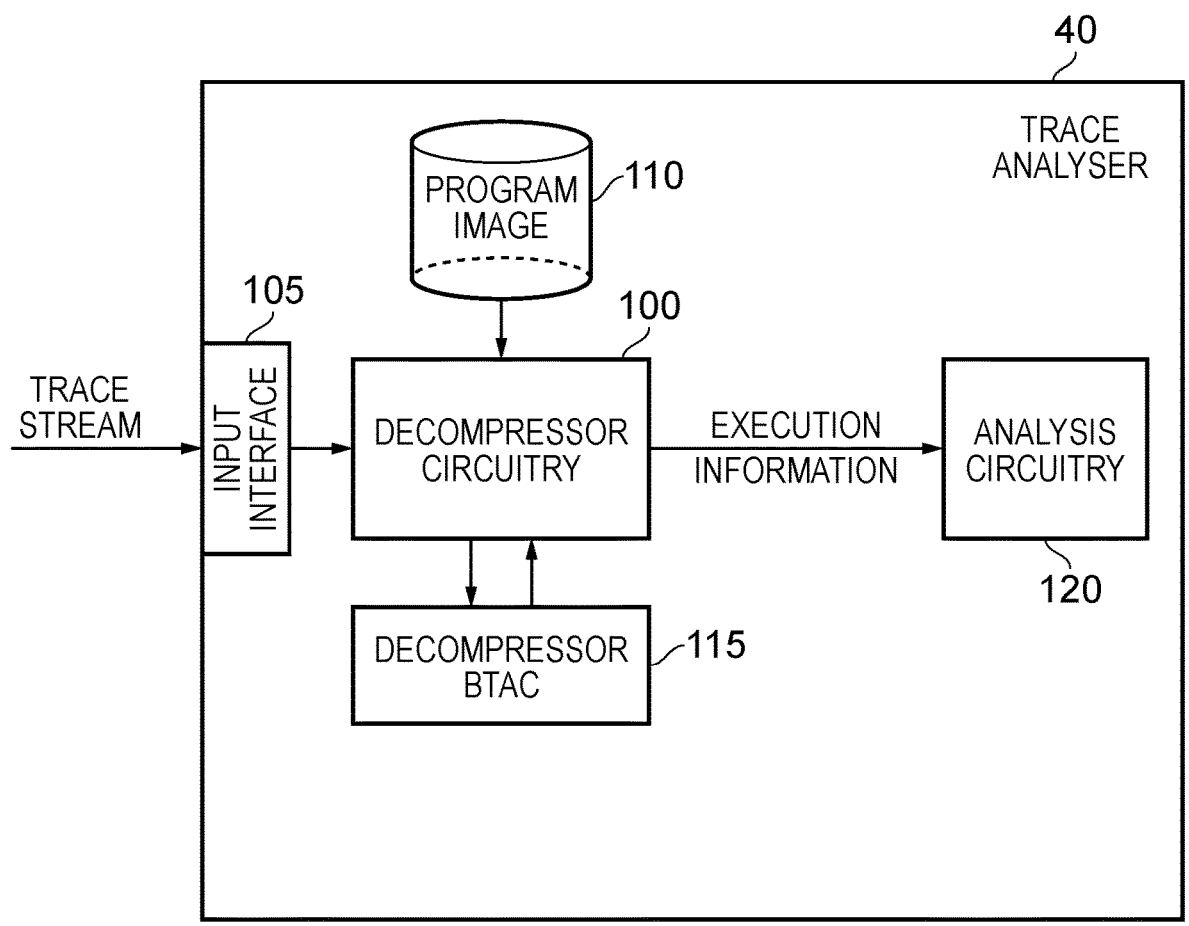
FIG. 3 is a block diagram illustrating in more detail trace analysis circuitry used in accordance with one embodiment.

FIG. 3 is a diagram schematically illustrating the trace analyser 40 of one embodiment. The trace analyser 40 receives the trace stream at its input interface 105, from where that information is then forwarded to decompressor circuitry 100. The decompressor circuitry 100 has access to a program image 110 providing a copy of the program code executed by the monitored circuitry. The decompressor circuitry 100 keeps track of a current address within the program image (the current address being set to a predetermined initial value at predetermined points, such as when trace is turned on, or through dedicated trace information), and each time a new atom is received, it the traverses the program image until it reaches a next instruction within the program image that is of a particular type, e.g. a branch instruction in the above example where each trace element within the trace stream is indicative of execution of a branch instruction. The decompressor circuitry extracts from the program image information about each of the instructions executed between the current address and the address of that next predetermined instruction, and outputs all of that execution information to the analysis circuitry 120 for analysis. Once that next predetermined instruction has been encountered in the program image, the current address is then updated based on the target address of that encountered branch, so that when the next atom is received in the trace stream, the same program image traversal process can begin again, starting from the new current address.

Figure 4B:
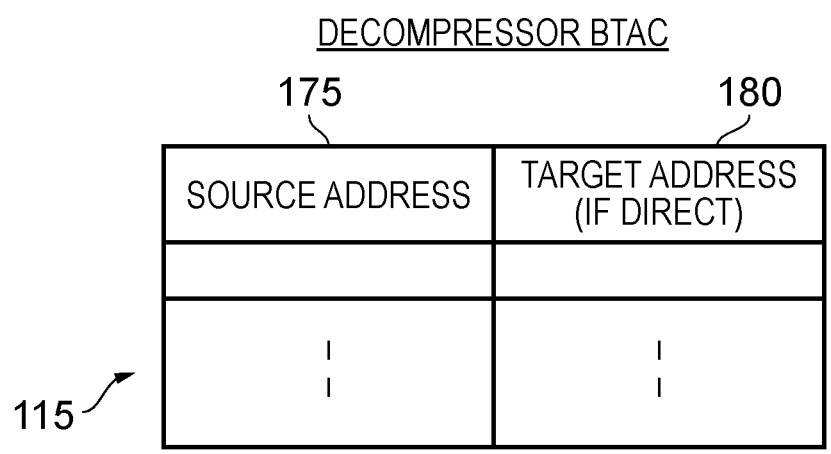

As mentioned earlier, in addition to standard branch instructions, the trace stream will also include trace elements that have been inserted by the trace module 20 when the processing element 50 has executed a branch behaviour setting instruction, and when the trace module 20 has detected that a branch to a target address has occurred due to an identified instruction indicated by a branch behaviour setting instruction having been encountered by the processing element 50. To enable the decompressor circuitry 100 to perform an appropriate traversal of the program image in such instances, the decompressor circuitry also has an associated local BTAC, referred to in FIG. 3 as the decompressor BTAC 115. When the decompressor circuitry 100 traverses the program image 110, as and when it encounters a branch behaviour setting instruction that populates an entry in the BTAC 55, it then stores within the decompressor BTAC 115 branch control information derived from that branch behaviour setting instruction. In one embodiment, the decompressor BTAC takes the form shown in FIG. 4B, and comprises one or more entries, where each entry has a field 175 for storing as a source address the address of the instruction identified by the branch behaviour setting instruction (or any other equivalent branch point data as discussed earlier), and also has a field 180 for storing the target address if that target address is directly determinable from the branch behaviour setting instruction. In particular, in that event, the decompressor circuitry 100 will be able to determine the target address directly from the contents of the program image, and accordingly captures that target address within the field 180. If the target address is not directly determinable, the field 180 is left blank, and instead the decompressor circuitry will later determine the target address from information provided within the trace stream.

With the decompressor BTAC 115 populated in the above described manner, the decompressor circuitry 100 is then able to reference the decompressor BTAC 115 as its traverses the program image. Whenever it detects from the address of the current instruction being considered within the program image that there is a hit with the source address information in one of the entries of the decompressor BTAC 115, it determines that that currently considered instruction is an identified instruction that has been identified by a branch behaviour setting instruction, and hence treats that identified instruction as the next predetermined instruction rather than waiting until it reaches the next branch instruction. At that point the decompressor circuity 100 can provide to the analysis circuitry 120 information about all of the instructions traversed during the current traversal of the program image, and can also at that point update the current address to the target address. For a direct target address, that will be the target address indicated within the field 180 of the relevant entry within the decompressor BTAC 115, whilst for an indirect target address, that target address information will be provided directly within the trace stream in association with the atom that is currently being considered.

The trace analyser 40 may be arranged to invalidate its decompressor BTAC 115 contents upon occurrence of one or more predetermined trace control events, to hence ensure that no out-of-date information is maintained within the decompressor BTAC 115.

Figure 5:
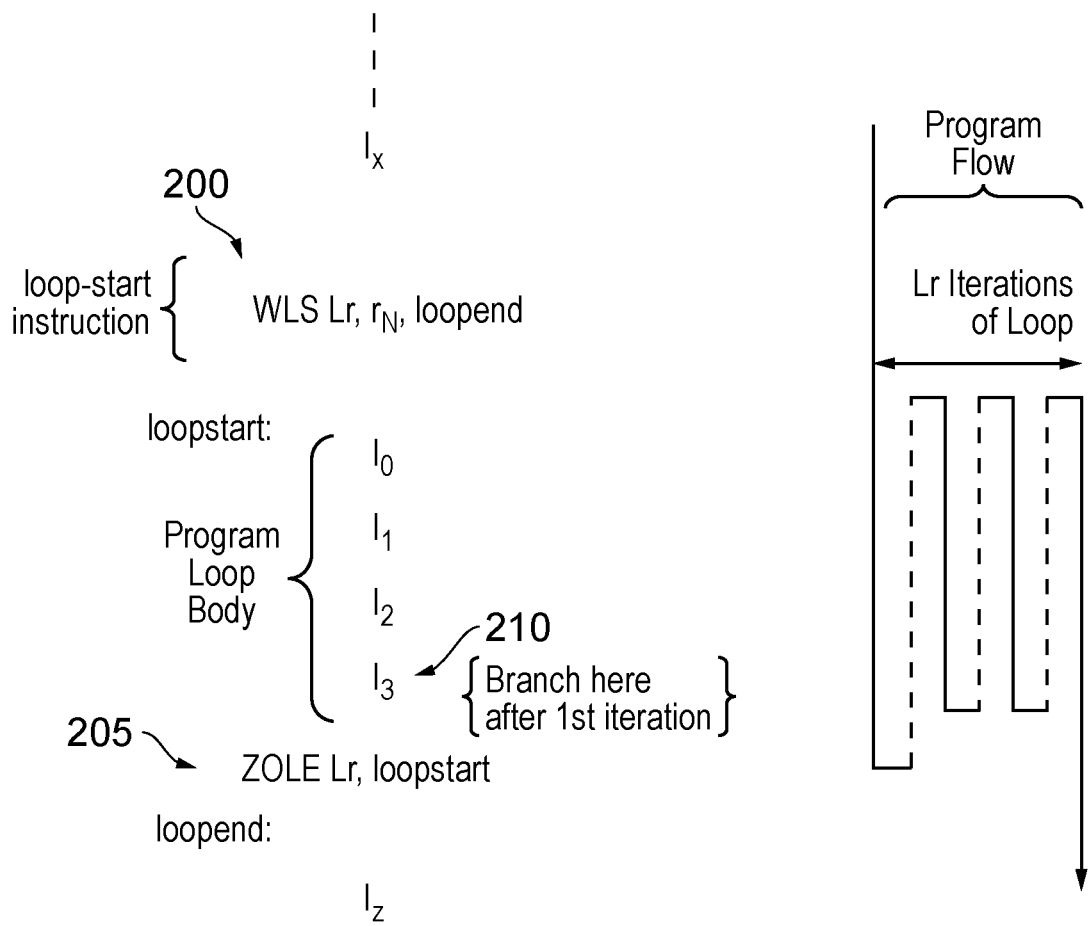
FIG. 5 is a diagram schematically illustrating operation of a zero overhead loop.

FIG. 5 is a diagram schematically illustrating a zero overhead loop, and the use of an associated ZOLE instruction as an example of the earlier-mentioned branch behaviour setting instruction. The start of the loop is indicated by the WLS instruction 200 (where WLS stands for "while loop start"). This is a conditional form of loop start instruction that is dependent on the while statement. Assuming the conditions are met, the loop start instruction will cause a value provided within the register $r_N$ to be stored within the link register Lr, this value being an indication of the number of iterations of the loop required. Assuming this functionality is performed, then the WLS instruction will be traced as a non-taken branch by issuing an N atom. However, if the condition is not met, then instead execution of the WLS instruction causes the processing to branch to the position "loopend", which in one embodiment is the instruction immediately following the ZOLE instruction indicating the end of the program loop body. Assuming this functionality is performed, then the WLS instruction will be traced as a taken branch by issuing an E atom.

During a first iteration, assuming that the loop is entered (as opposed to branching to loopend), then each of the instructions within the loop body is executed and at some point the ZOLE instruction 205 will be executed. This takes as an input the link register value, and assuming the link register value is non-zero, this causes an entry in the BTAC 55 to be populated, identifying as the source address the address of the instruction $I_3$ 210, and indicating as the target address the address "loopstart" specified within the ZOLE instruction. The count value in the link register is also decremented, and a branch is taken back to loopstart. Hence, the ZOLE instruction will be traced as an E atom to indicate that the branch has been taken.

As shown by the schematic in the right hand side of FIG. 5, during each subsequent iteration of the program loop body (other than a final iteration), when the $I_3$ instruction 210 is encountered, a hit will be detected in an entry of the BTAC 55, it will be determined that the iteration count is still non-zero, and accordingly the iteration count will be decremented and a branch will be taken back to loopstart. Hence, during each of those iterations, there is no need to re-execute the ZOLE instruction 205, hence giving rise to significant performance improvements. On a final iteration, when the $I_3$ instruction is encountered, it will be determined that the iteration count is now zero and accordingly no further iterations are required. Hence, the branch behaviour will not be associated with the $I_3$ instruction on the final iteration, and instead the ZOLE instruction 205 will be re-executed. However, at this point it will determine that the link register value is zero, and will accordingly execute the not taken branch, causing the program counter to be updated to "loopend".

Whilst in FIG. 5 a conditional variant of the loop start instruction is shown, in an alternative embodiment the loop start may be an unconditional variant, which in one embodiment is referred to as a DLS (do loop start) instruction, which will always update the link register to the iteration count value within the register $r_N$. As the DLS instruction is not a branch instruction, no atom will be issued within the trace stream when the DLS instruction is executed.

Figure 6:
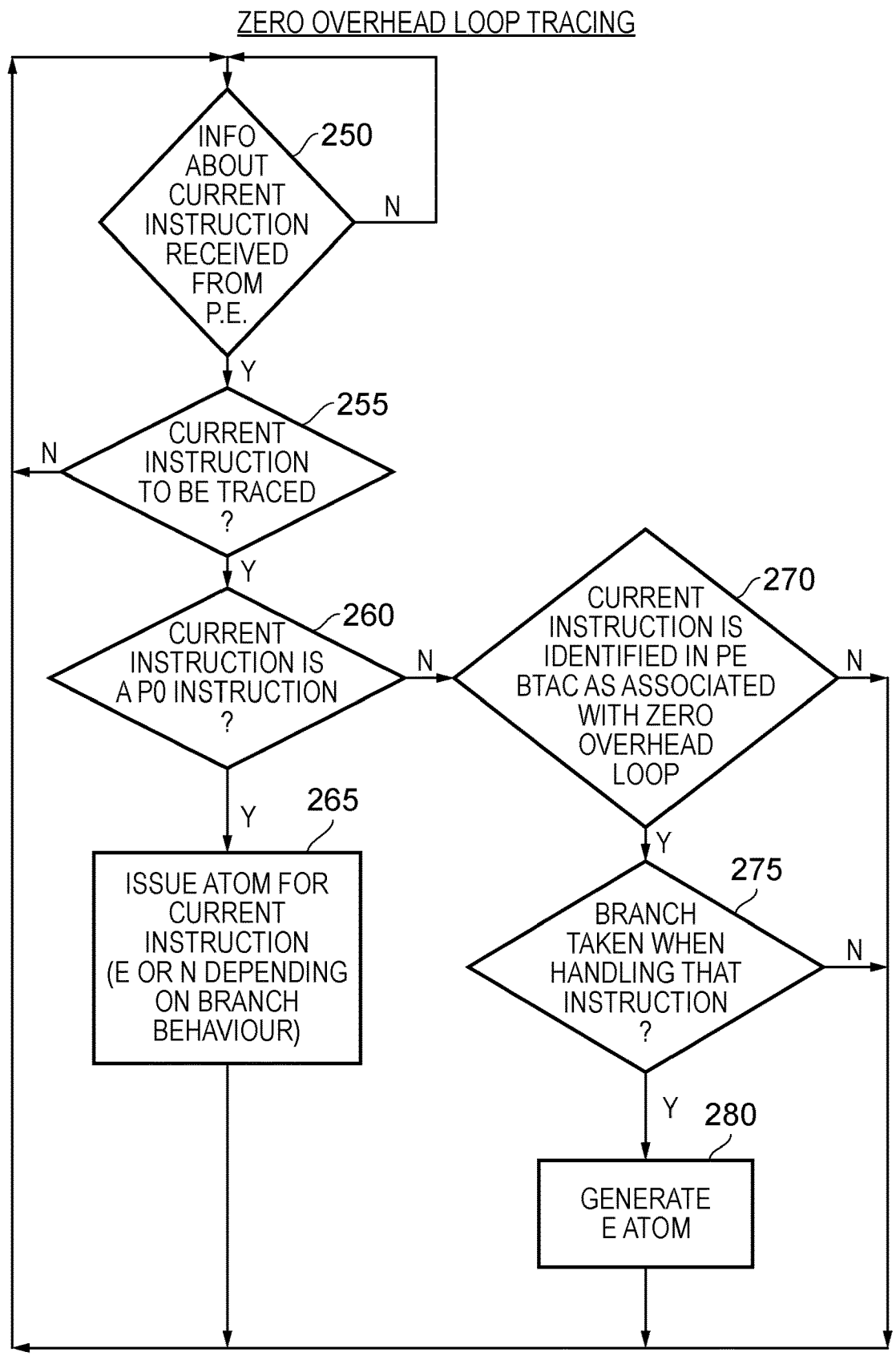
FIG. 6 is a flow diagram illustrating operation of the trace module to generate trace elements associated with execution of an instruction sequence including a zero overhead loop, in accordance with one embodiment.

FIG. 6 is a flow diagram illustrating how a program sequence including a zero overhead loop is traced in accordance with one embodiment. At step 250, the trace generation circuitry 60 awaits receipt of information about the current instruction being executed by the processing element 50. Thereafter, it is determined at step 255 whether that current instruction is to be traced. Whilst in some embodiments it may be decided that the entire instruction sequence is to be traced, in other embodiments the trace mechanism may be selectively turned on and off dependent on the instructions currently being executed. This enables particular portions of the code to be traced, whilst other portions are not traced. In such embodiments, a trace stream will only be produced relating to those portions of the code that are to be traced, and the actual trace elements issued within the trace stream will then only relate to certain instructions executed within those portions of the code.

If it is determined at step 255 that the current instruction is not to be traced, then the process merely returns to step 250 to await information about the next instruction executed by the monitored circuitry.

When it is determined at step 255 that the current instruction is to be traced, then it is determined at step 260 whether the current instruction is one of the predetermined instructions that trace elements should be generated for. In one embodiment, such instructions are instruction flow changing instructions, particularly branch instructions, and herein such instruction will be referred to as "P0 instructions". Whilst in one embodiment the P0 instructions will be branch instructions, it is possible that other types of instructions may also be considered to be P0 instructions, and will accordingly cause corresponding atoms to be issued in the trace stream.

When considering the earlier example of FIG. 5, it will be appreciated that both the WLS instruction 200 and the ZOLE instruction 205 are branch instructions, and accordingly will be treated as P0 instructions at step 260.

Each time a P0 instruction is detected at step 260, an atom is issued for that instruction at step 265. In one embodiment, this atom will either be an E atom if a branch is taken for that current instruction or an N atom if a branch is not taken.

If the instruction execution information indicates that the branch is taken, it will typically also identify whether the target address is a direct target address or an indirect target address. If the target address is a direct target address, then the target address information does not need to be output in the trace stream. However, if the target address is indirect, then in one embodiment an indication of the target address is also output in a further packet in association with the E atom so as to enable the trace analyser to determine where instruction flow has branched to in due course. Following step 265, the process returns to step 250 to await information about the next instruction.

If at step 260 it is determined that the current instruction is not a P0 instruction, it is then determined at step 270 whether the current instruction is an instruction that is identified in the processing element's BTAC 55 as an instruction associated with a zero overhead loop. In one embodiment this information is provided as part of the instruction execution information from the processing element 50, based on detection of a hit in an entry of the BTAC 55 by comparing the source address of the current instruction with the source address field 155, and by the BF/ZOLE flag field 165 indicating that the hit entry was populated as a result of executing a ZOLE instruction.

If it is determined that the current instruction is identified in the processing element's BTAC as associated with a zero overhead loop, it is then determined at step 275 whether a branch was taken when handling that instruction, as will be indicated by the instruction execution information from the processing element. As mentioned earlier, this will be the case if at least one further iteration of the program loop is required at the time that instruction is encountered. If a branch was taken, then at step 280 an E atom is generated for inclusion within the trace stream. As with step 265, if the target address is determined to be an indirect target address, then an indication of the target address will also be output as an additional packet within the trace stream in association with the E atom. However, for a direct target address, no additional information is required and only the E atom needs to be issued. If the no path is followed from either of step 270 or step 275 then the process returns to step 250.

Figure 7:
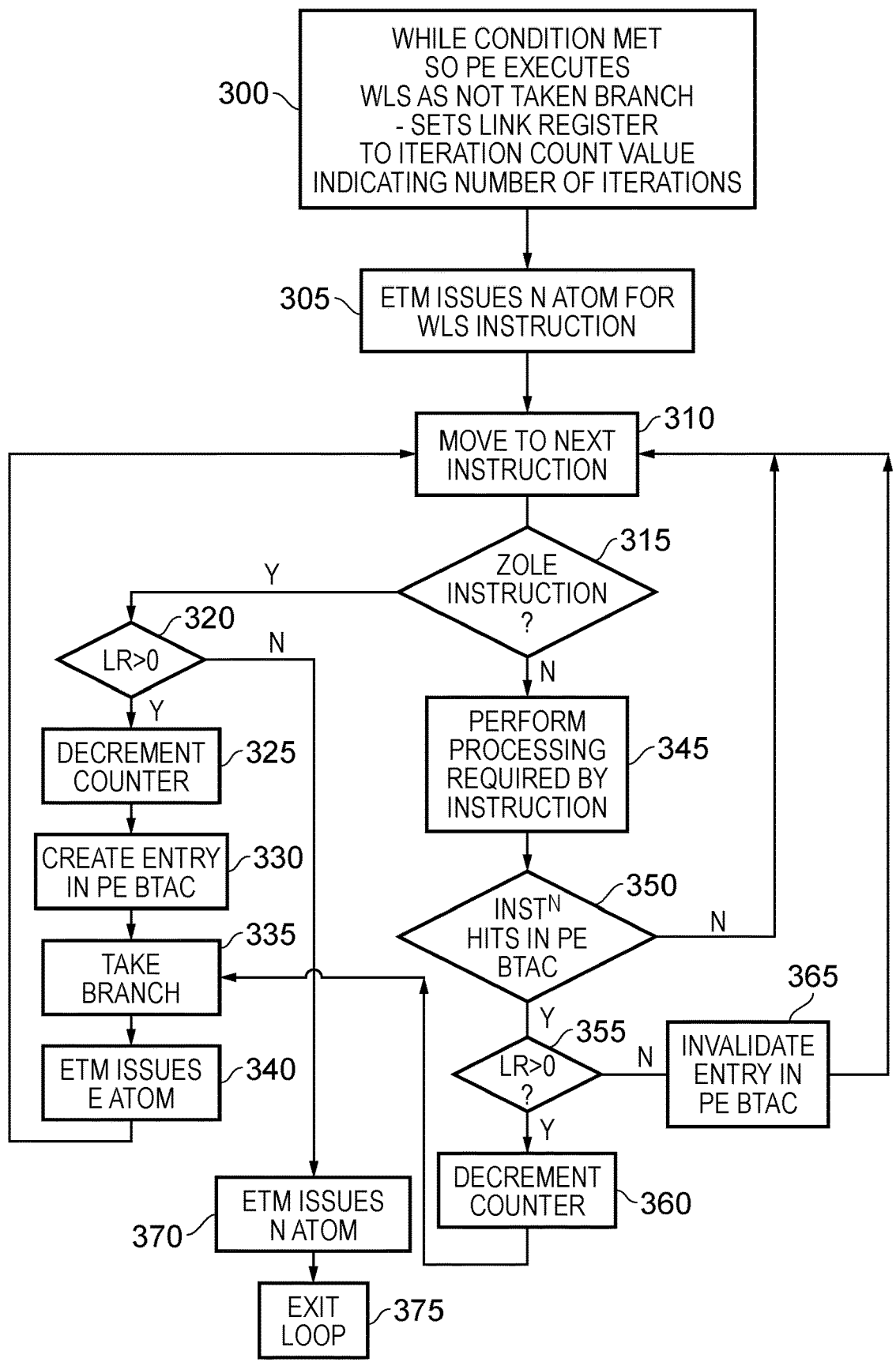
FIG. 7 is a flow diagram showing execution of a zero overhead loop, and the associated trace elements generated, in accordance with one embodiment.

FIG. 7 is a flow diagram illustrating execution of a zero overhead loop along with an indication of when particular trace elements will be generated. In this example, it is assumed that the zero overhead loop is started by a WLS instruction whose conditions for execution are met. Hence, at step 300 it is determined that the while condition is met, so the processing element executes the WLS instruction as a not taken branch. At this point, it sets the link register value to an iteration count value provided within the source register $r_N$, that iteration count value indicating the number of iterations. In one embodiment, the count value is set to indicate the number of iterations required in addition to the first iteration, as the first iteration is automatically performed as a result of the WLS instruction being processed as a not taken branch.

Given that the WLS instruction is processed as a not taken branch, then at step 305 the trace module issued an N atom in association with the WLS instruction. As discussed earlier, if the WLS instruction was replaced by a DLS instruction, the link register will still be set with the iteration count value, but no trace atom will be generated as the DLS instruction is not a branch instruction.

Following step 305, processing proceeds to the next instruction at step 310. At this point it is determined whether the next instruction is the ZOLE instruction at step 315, and if not the processing required by the instruction is performed at step 345. This includes determining at step 350 whether the instruction causes a hit in the processing element's BTAC. During the first iteration of the zero overhead loop, this will not be the case for any of the instructions between the WLS instruction and the ZOLE instruction, and accordingly the process will loop back to step 310 and continue through steps 315, 345, 350 until the ZOLE instruction is reached. When the ZOLE instruction is executed at step 315 at the end of the first iteration, the branch and loop control circuitry 58 will be used to perform steps 320 to 335, and it will first be determined at step 320 whether the link register count value is greater than 0. As mentioned earlier, this will only be the case if at least one further iteration is required.

Assuming at least one further iteration is required, then the counter will be decremented at step 325 by updating the link register value, and at step 330 an entry will be created in the processing element's BTAC 55. As discussed earlier, this will identify as the source address the immediately preceding instruction before the ZOLE instruction, and will identify as the target address the first instruction within the program loop.

Thereafter, a branch is taken at step 335 to return processing to the start of the program loop, whereafter at step 340 the trace module issues an E atom to identify that a taken branch is associated with execution of the ZOLE instruction. Processing then moves to the next instruction at step 310 which in this instance will be the first instruction within the program body loop after the WLS instruction.

Processing will then proceed through the second iteration of the program loop body, and at some point it will be determined at step 350 that the current instruction being processed has caused a hit in the processing element's BTAC. This for example will be the case when the instruction $I_3$ 210 of FIG. 5 is executed when considering the zero overhead loop example of FIG. 5. At that point, the branch and loop control circuitry 58 will determine whether the link register contents are greater than zero and if so will decrement the counter at step 360, whereafter the process will proceed to step 335. Step 335 and 340 will then be performed in exactly the same way as they would have been performed had the ZOLE instruction been executed. However, it will be appreciated that at this point the processing does not proceed to the ZOLE instruction itself, and accordingly the ZOLE instruction does not need to be re-executed, hence giving rise to significant performance improvements.

On a final iteration through the program loop, it will be determined at step 355 that the link register is no longer greater than zero when executing that penultimate instruction in the program loop, and at this point processing proceeds to step 365, where the branch and loop control circuitry 58 invalidates the relevant entry in the processing element's BTAC prior to returning to step 310. At step 310, processing will then proceed to the ZOLE instruction which will now be re-executed. However, in this instance it will be determined at step 320 that the link register contents are no longer non-zero, and accordingly processing proceeds to step 370 where the trace module issues an N atom in association with this current execution of the ZOLE instruction, whereafter at step 375 the loop is executed.

It should be noted from the processing of FIG. 7 that if for some reason the relevant entry in the processing element's BTAC is invalidated whilst processing is part-way through the multiple iterations of the zero overhead loop, this would cause the penultimate instruction to not be identified as having hit in the processing element's BTAC at step 350 when it is next encountered, which would then cause processing to advance to the ZOLE instruction. However, if the ZOLE instruction is re-executed at a point where the link register contents are still non-zero, then steps 325, 330, 335, 340 will be re-executed, causing performance of the zero overhead loop to be resumed. For the purposes of the trace analyser, it does not matter whether the E atom issued at step 340 is due to re-execution of the ZOLE instruction or due to execution of the penultimate instruction associated with a hit in the processing element's BTAC.

Table 1 below illustrates an example code sequence that may be executed in order to implement a zero overhead loop in a manner consistent with the approach described in FIG. 7:

TABLE 1

Example trace of a Zero-Overhead Loop

| PE execution | | Trace elements | Notes |
| --- | --- | --- | --- |
| 0x1000 | WLS -><br>0x2000 | trace_info_element( )<br>trace_on_element( )<br>context_element( )<br>address_element(0x1000)<br>atom_element(N) | Tracing begins here, causing the first four trace packets illustrated to be issued. In addition, the WLS instruction is traced as a P0 element, which in this case is not taken (non-zero number of loop iterations). An N Atom is generated to represent this. |

TABLE 1-continued

Example trace of a Zero-Overhead Loop

| PE execution | | Trace elements | Notes |
|---|---|---|---|
| 0x2000 | VLDR | — | None of these instructions are traced as P0 elements, therefore no trace elements are generated. |
| 0x2004 | VADD | — | |
| 0x2008 | ZOLE -> 0x2000 | atom_element(E), or atom_element(N) | End of zero-overhead loop. This is executed at least on the first and last iterations of the loop. If the return branch is taken, an E Atom is generated. If the branch is not taken, an N Atom is generated. If the branch occurred implicitly before reaching this instruction (due to the VADD instruction at address 0x2004 hitting in the BTAC, an E Atom is generated. |

Figure 8:
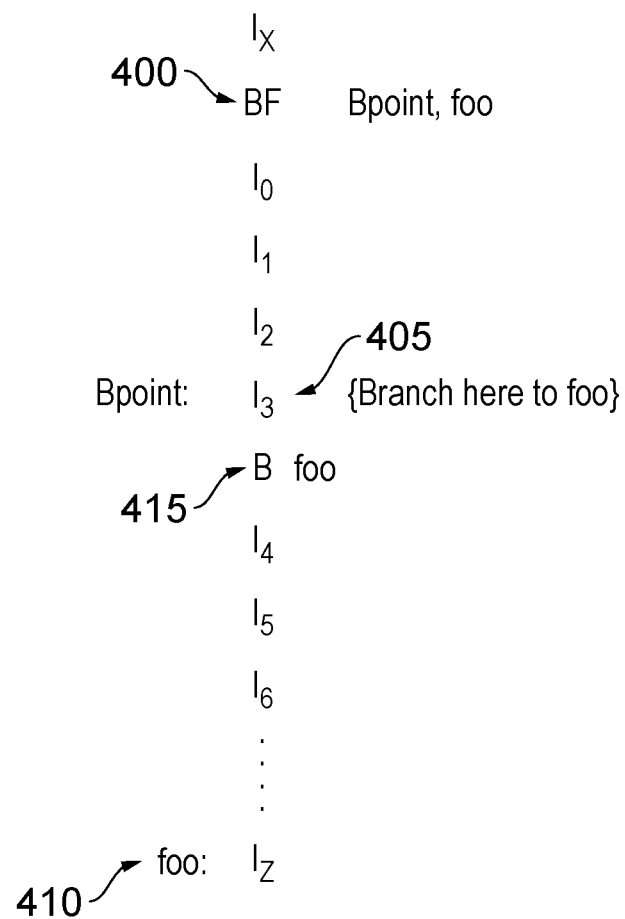
FIG. 8 illustrates an example program sequence including a branch-future instruction.

FIG. 8 schematically illustrates a further type of branch behaviour setting instruction that may be used in one embodiment, this type of branch behaviour setting instruction being referred to herein as a branch-future instruction. When the branch-future instruction 400 is executed, then provided any conditions associated with the branch-future instruction are met, this will populate an entry within the BTAC 55 to identify as the source address the value "B point" and to set as the target address the value "foo" 410. Then when the instruction $I_3$ 405 is encountered, and provided the entry is still valid within the BTAC 55, this will cause processing to branch to the address foo 410, in order to cause the instruction $I_Z$ to be the next instruction executed. In one embodiment, this branch behaviour may override execution of the instruction $I_3$, so that when the instruction $I_3$ is encountered, the only action taken is to branch to the point 410. However, in an alternative embodiment, the processing may be arranged to perform the normal operations required when executing the instruction $I_3$, and then in parallel to branch to the point 410 so that the next instruction executed is the instruction $I_Z$.

In one embodiment, the branch instruction 415 can be provided as a backup to cause a branch to take place to be address "foo" 410. This can be useful for example in implementations where the branch-future functionality can be disabled, or to cover situations where the contents of the BTAC 55 are invalidated between the time the branch-future instruction 400 is executed and the time the instruction $I_3$ 405 is encountered. However, it should be noted that the tracing techniques described herein do not require such a back-up branch instruction 415 to be provided.

Figure 9:
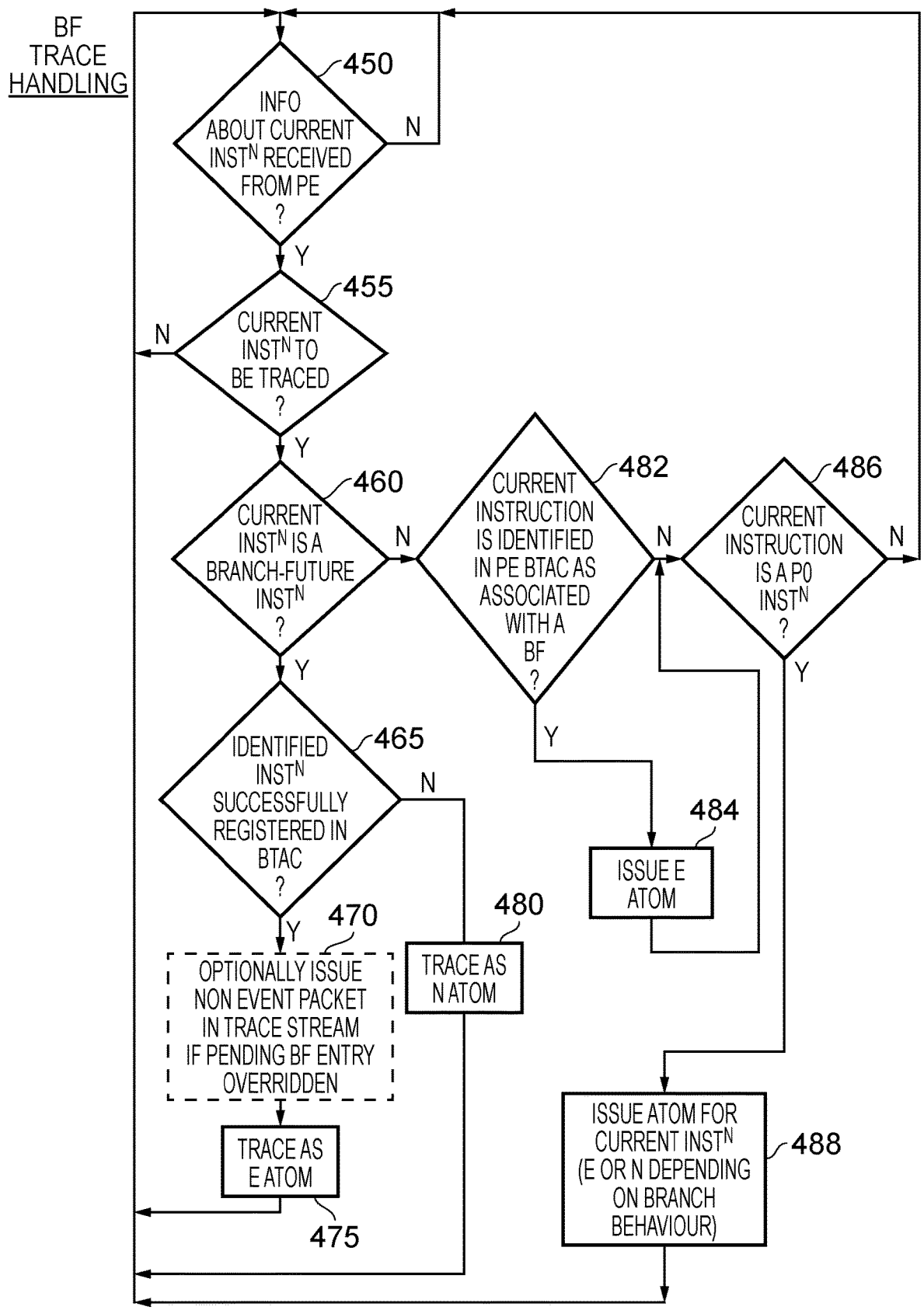
FIG. 9 is a flow diagram illustrating operation of the trace module to generate trace elements associated with execution of a sequence of instructions including one or more branch-future instructions, in accordance with one embodiment.

FIG. 9 is a flow diagram illustrating the steps performed in order to trace a sequence of instructions that includes one or more instances of a branch-future instruction. Steps 450 and 455 correspond to the earlier-described steps 250 and 255 of FIG. 6. When it is determined at step 455 that the current instruction is to be traced, it is determined at step 460 whether the current instruction is a branch-future instruction. If it is determined that the current instruction is a branch-future instruction, it is then determined at step 465 whether the identified instruction identified by that branch-future instruction was successfully registered in the BTAC. This is derivable from the instruction execution information received from the processing element. As mentioned earlier, there may be a number of reasons why the identified instruction was not successfully register in the BTAC. For example, the branch-future instruction may be conditional, so that only when certain conditions are met will an entry be made in the BTAC. Further, in one embodiment, the branch-future feature may selectively be disabled, and when disabled the encountering of the branch-future instruction will not cause an entry to be made in the BTAC. When it is determined at step 465 that the identified instruction has been successfully registered in one of the BTAC entries, then the branch-future instruction is traced as an E atom at step 475, whereas otherwise it is traced as an N atom at step 480. The process then returns to step 450.

In one embodiment, the BTAC 55 may only have a small number of entries, and indeed could in one embodiment have a single entry. In such situations, it is possible that when the identified instruction is successfully registered in the BTAC at step 465 this will overwrite information pertaining to another active identified instruction of a previously executed branch-future instruction, in which event the BTAC will then lose information about an instruction that has been identified by a previously executed branch-future instruction but which has not yet been encountered in the instruction stream. It is important that the trace analyser can detect when such a situation has occurred. In some embodiments, the trace analyser may know the replacement policy used within the BTAC 55 and may deterministically be able to determine from the existing trace information situations where such an overwriting of active branch control information has taken place. However, otherwise the trace generation circuitry 60 can be arranged to issue a non-event packet in the trace stream at step 470 if such a pending branch-future entry within the BTAC is overwritten, prior to issuing the E atom at step 475.

If at step 460 it is determined that the current instruction is not a branch-future instruction, it is then determined at step 482 if the current instruction is identified in the processing element's BTAC as associated with a branch-future instruction. This will occur if the processing element detects a hit between the source address of the current instruction and an entry in the BTAC, where the associated field 165 indicates that the entry has been populated due to execution of a previous branch-future instruction. In such a situation, the process proceeds to step 484 where an E atom is issued in association with the current instruction.

If the "No" path is followed from step 482, or following performance of step 484 if the "yes" path is followed, at step 486 it is determined whether the current instruction is a P0 instruction, which as mentioned earlier will typically be a branch instruction. Whenever such a P0 instruction is encountered, the process will proceed to step 488, where an atom will be issued for the current instruction (which for a branch instruction example of a P0 instruction will be an E atom if the branch is taken or an N atom if the branch is not taken). Assessing whether the current instruction is a P0 behaviour setting instruction has caused the corresponding entry to be populated within the BTAC.

Table 2 below gives an example of a program sequence that may be executed, which has a nested pair of branch-future instructions and results in the generation of the non-event packet in one embodiment (this example assuming a single entry BTAC):

TABLE 2

Example of a nested Branch Future program (since there is only one BTAC entry in this case, the second BF will invalidate the first and register its own implicit branch), showing the E Atoms issued, and the non-event packet.

| PE execution | | Trace elements | Notes |
|---|---|---|---|
| 0x1000 | BF @ 0x100C -> 0x2000 | trace_info_element( ) trace_on_element( ) context_element( ) address_element(0x1000) atom_element(E) | Tracing begins here, as before. The BF generates an E Atom to indicate a future implicit branch has been registered (i.e. a branch associated with address 0x100C) |
| 0x1004 | BF @ 0x1010 -> 0x2004 | zo_nonevent_element( ) atom_element(E) | Since a BF is already active when this second BF is executed, a ZO_NonEvent packet is generated to indicate the previously stored BTAC entry has been invalidated. The new BF generates an E Atom to indicate a future implicit branch has been registered. Note: if the replacement policy is known to the trace decoder and is deterministic, the ZO_NonEvent packet can be omitted. |
| 0x1008 | SUB | — | Not a P0 element, so no trace packet is generated. |
| 0x100C | | — | Location of first implicit branch. Since it was invalidated previously, no packet is generated and program flow continues through. |
| 0x100C | . . . | — | Fallback code for first BF. This will likely be a branch and is traced accordingly. |
| 0x1010 | (implicit branch) | atom_element(E) | Location of the second implicit branch. Since the BTAC entry is valid and the implicit branch taken, an E Atom is generated. Program flow continues to branch target and is traced accordingly. Additional packets may be generated if the corresponding branch target was an indirect branch. | instruction after following the "yes" path from step 482 enables situations to be detected where the instruction identified by a branch-future instruction is also a P0 instruction in its own right. An example would be a memory instruction when data tracing is enabled. In such a case, two E atoms would be issued, one for the taken branch (the E atom at step 484), and one for the P0 element itself, i.e. the memory instruction (the atom issued at step 488).

At either of steps 484 or 488, if the target address is a direct target address, no additional information is required in association with the E atom issued. However, if the target address is indirect, then an additional trace packet can be issued in association with the E atom to identify the target address.

Figure 10:
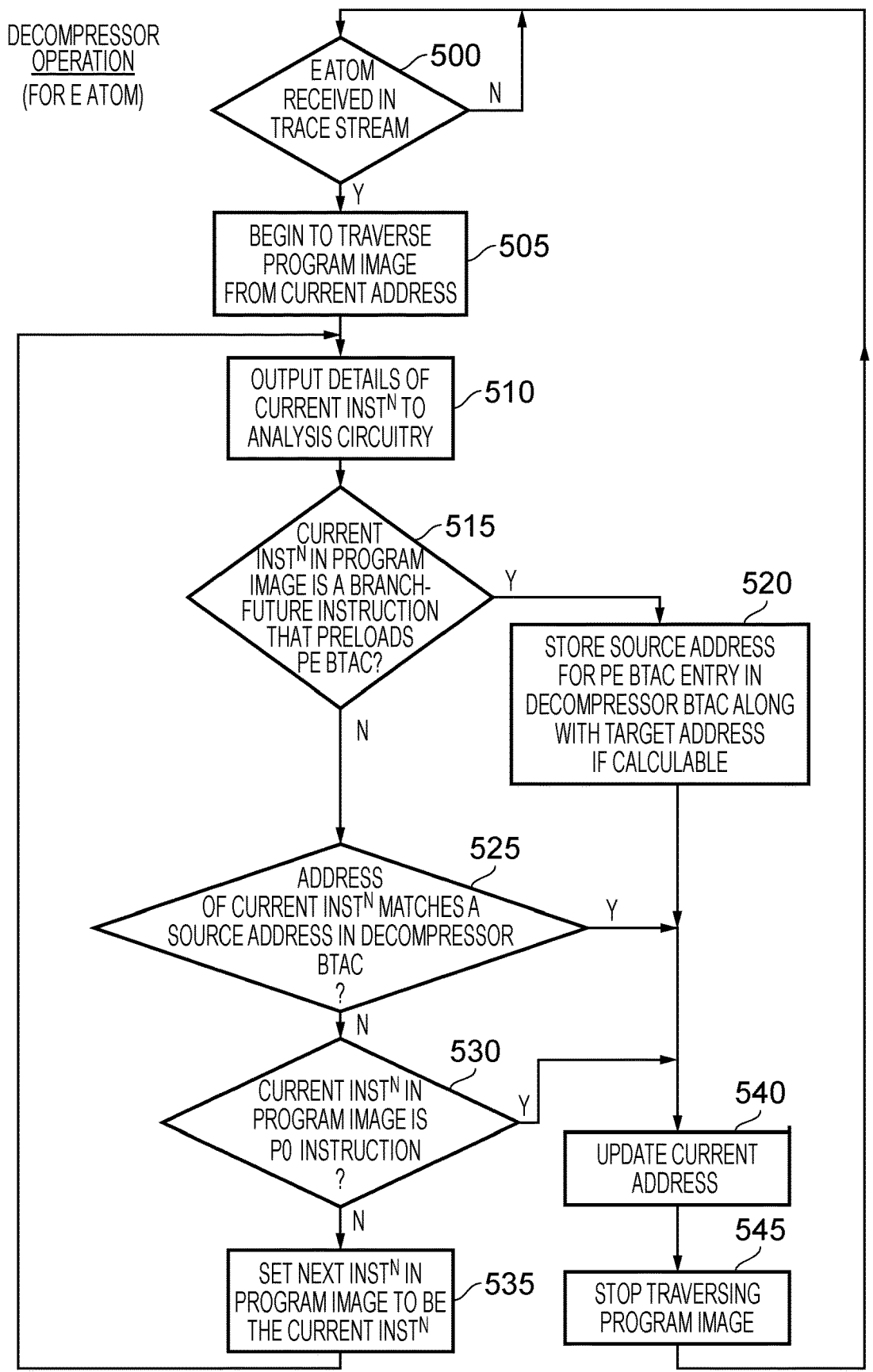
FIG. 10 is a flow diagram illustrating the decompression operation performed at the trace analyser in association with each E atom received in the instruction stream, in accordance with one embodiment.

In some implementations, the program sequence will only include one of the earlier-mentioned types of branch behaviour setting instruction, but in other embodiment the instruction sequence may include zero overhead loops with associated ZOLE instructions, and additionally may include branch-future instructions, with the field 165 in the processing element's BTAC 55 indicating which type of branch FIG. 10 is a flow diagram illustrating processing steps that may be performed by the decompressor circuitry 100 of FIG. 3 in accordance with one embodiment, upon receipt of an E atom that has been generated by the trace circuitry. This process can be performed irrespective of whether one or both types of branch behaviour setting instructions are included within the instruction stream. At step 500, it is determined whether an E atom has been received in the trace stream at the input interface 105. Once an E atom has been received, then at step 505 the decompressor circuitry 100 begins to traverse the program image 110 from a current address. At a trace start point, or at a synchronization point within the tracing activities, the current address may be set to a specified value. Thereafter, it will be updated based on the program traversal operation performed by the decompressor circuitry, as will be apparent from the further discussion of FIG. 10 below.

At step 510, the details of the current instruction are output to the analysis circuitry 120, and at step 515 it is determined with reference to the program image whether the current instruction (i.e. the instruction pointed to the by the current address) is a branch-future instruction which preloads the processing element's BTAC 55. If it is, then the presence of the E atom will indicate that execution of that instruction has indeed caused an entry to be made in the processing element's BTAC, and the process accordingly proceeds to step 520 where the decompressor circuitry 100 allocates an entry in its decompressor BTAC 115 and stores within that entry as a source address the address of the instruction identified by the branch behaviour setting instruction. In addition, it stores within that entry that target address if that is calculable directly from the current instruction, i.e. the branch-future instruction. The processing then proceeds to step 540, where the current address is updated to point to the next instruction to be processed after executing the branch-future instruction that preloads the processing element's BTAC. This will typically be the next instruction following that branch-future instruction.

Whilst the decompression circuitry may also be arranged, if desired, to detect at step 515 when the current instruction is a ZOLE instruction that has caused an entry to be made in the processing element's BTAC, and then make an entry in its associated BTAC at step 520, in one embodiment this is not done, and instead no entry is made in the decompression circuitry's BTAC for the identified instruction of each ZOLE instruction. In particular this is not needed, as for a ZOLE instruction the identified instruction will be the immediately preceding instruction in the program loop body, and hence the decompressor does not need to distinguish between the loop-end instruction and that immediately preceding instruction in order to correctly track the instruction execution behaviour of the processing circuitry. Thus there is no need to make an entry in the decompression circuitry's BTAC for the identified instruction.

In particular, an E atom generated at step 280 of FIG. 6 to indicate that a branch has been taken due to encountering the identified instruction of the ZOLE instruction as recorded in the processing element's BTAC will merely be determined by the decompression circuitry as being associated with the ZOLE instruction itself, which, due to being a branch instruction, will be detected as a P0 instruction at the later step 530 of FIG. 10, and which causes a branch to be taken to return to the start of the program loop. Accordingly, in that instance the process proceeds from step 530 to step 540, where the current address maintained by the decompressor circuitry is then updated to the target address. For the earlier-mentioned example of the ZOLE instruction, this will typically be provided as a direct target address within the ZOLE instruction. At step 545, the process stops traversing the program image, and the process returns to step 500 to await the next atom.

If it is determined at step 515 that the current instruction is not a branch-future instruction that preloads the processing element's BTAC, then at step 525 it is determined whether the address of the current instruction matches a source address stored in the decompressor BTAC 115. If so, then this indicates that the current instruction is an identified instruction that has been identified by a previously executed branch-future instruction, and because it is associated with an E atom this means that the branch behaviour will have been invoked on encountering that instruction. Accordingly, it is determined that this instruction should be treated as an instruction that causes the program image traversal process to stop in the same way as a P0 instruction would. Hence, the process proceeds to step 540 where the current address maintained by the decompressor circuitry is updated to the target address. This will either be available directly from the decompressor BTAC entry in the event that the target address was a direct target address, or will be available from information provided in the trace stream if the target address is an indirect target address. The process then proceeds to step 545 as discussed earlier.

In addition to updating the current address to the target address at step 540 following a detection of a match in the decompressor BTAC at step 525, the decompressor circuitry may in some instances invalidate the decompressor BTAC entry. In particular, when the processing element detects a hit in the BTAC 55 in association with an entry that has been populated by a preceding branch-future instruction, it will typically initiate the required branch behaviour and then invalidate the entry in the BTAC. Similarly, the decompressor BTAC can then be arranged to invalidate the relevant entry in its local BTAC 115 when step 540 is reached following detection of a hit at step 525 in the decompressor BTAC due to an entry which is associated with an earlier branch-future instruction.

If it is determined at step 525 that the address of the current instruction does not match a source address held in the decompressor BTAC, then this is determined at step 530 whether the current instruction in the program image is a standard P0 instruction, for example a branch instruction. If so, the process again proceeds to step 540, whereas otherwise the process continues to step 535. When it is determined at step 530 that the current instruction is a P0 instruction, the current address will be updated to the target address at step 540, and if the target address is indirect the target address information will be available from information provided in the trace stream.

When step 535 is reached, the next instruction in the program image is set to be the current instruction (by advancing the address to point to the next instruction in the program image), and the process returns to step 510.

Figure 11:
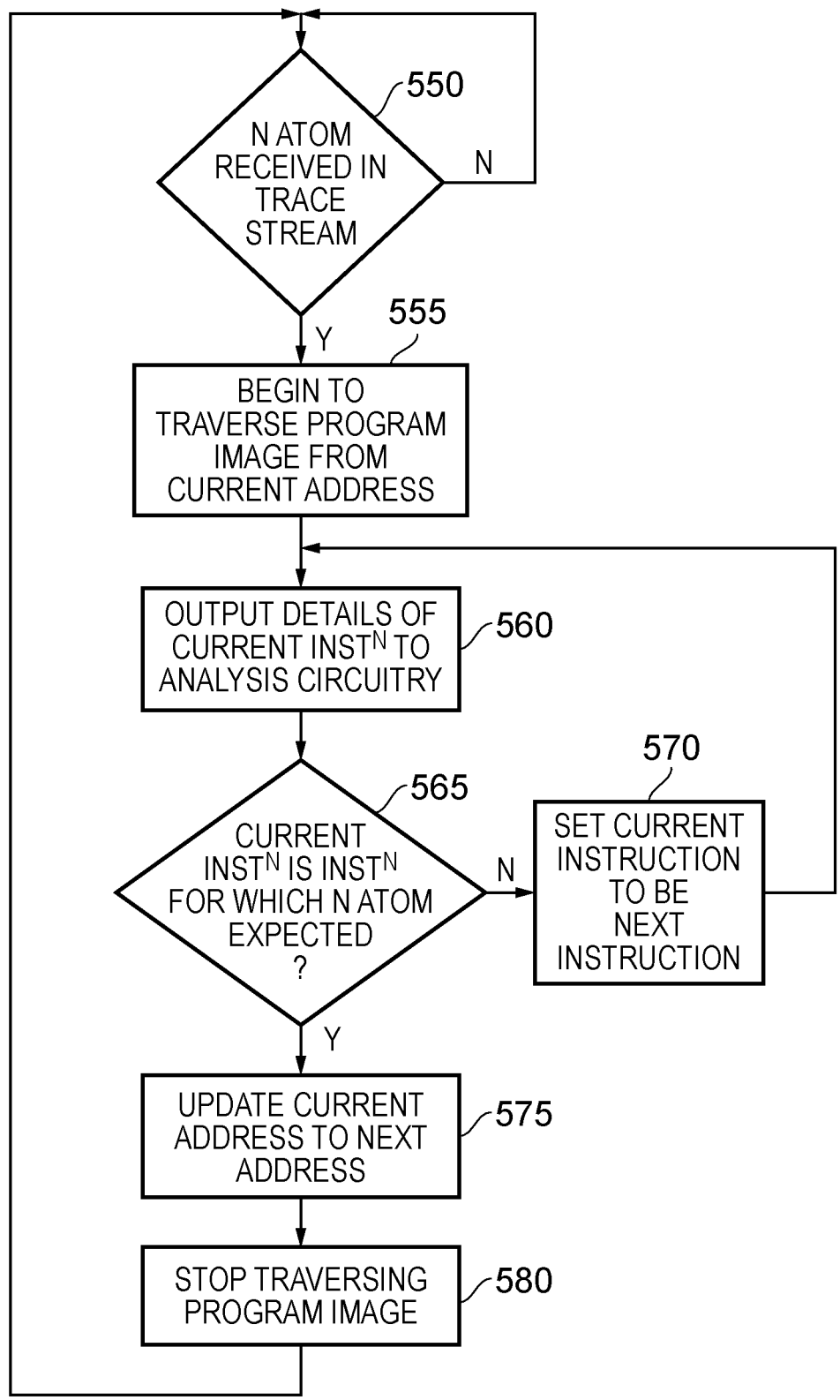
FIG. 11 is a flow diagram illustrating the decompression operation performed at the trace analyser in association with each N atom received in the instruction stream, in accordance with one embodiment.

FIG. 11 is a flow diagram illustrating steps performed by the decompressor circuitry 100 on receipt of an N atom. At step 550, it is determined whether an N atom has been received in the trace stream. When an N atom is received, then at step 555 the decompressor circuitry 100 begins to traverse the program image from the current address. At step 560, details of the current instruction are output to the analysis circuitry 120, and then at step 565 it is determined whether the current instruction is an instruction for which N atom is expected within the trace stream. It will be appreciated that in accordance with the above described embodiments, an N atom will be expected in association with a P0 instruction where the branch has not been taken, or in association with a branch-future instruction which has not resulted in the identified instruction successfully being registered in the processing element's BTAC.

If the current instruction is not one for which an N atom is expected, then at step 570 the next instruction is set to be the current instruction and the process returns to step 560.

However, if at step 565 it is determined that the current instruction is an instruction for which an N atom is expected, then at step 575 the current address is updated to point to the next instruction address, and at step 580 the decompressor circuitry stops traversing the program image. The process then returns to step 550 to await the next N atom.

Dependent on the type of instruction that has been detected at step 565, when step 575 is performed the decompressor circuitry may also invalidate the relevant entry in its decompressor BTAC. For example, this may arise when the N atom received is issued in association with a final execution of a ZOLE instruction (i.e. an N atom issued at step 370 of FIG. 7).

Figure 12:
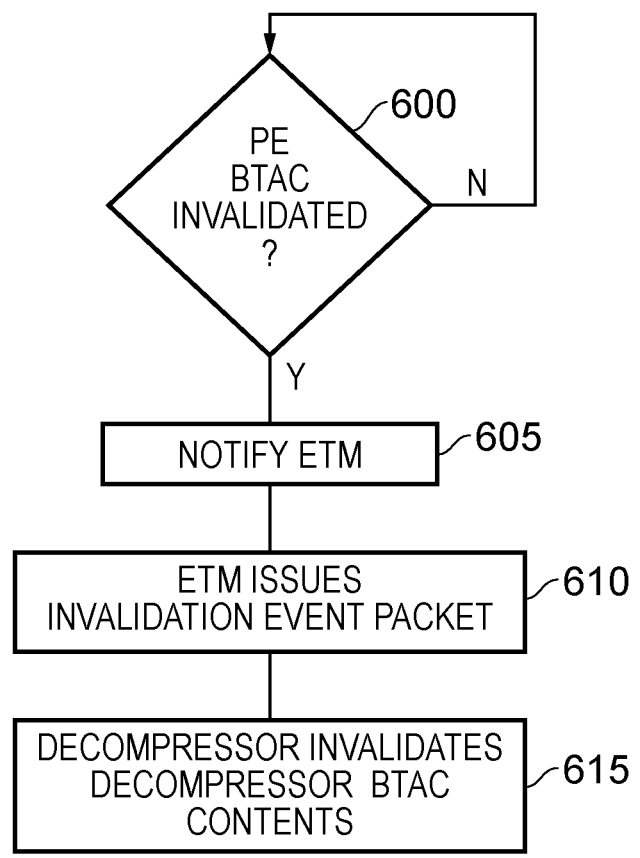
FIG. 12 is a flow diagram illustrating steps taken when the processing element's BTAC is invalidated, in accordance with one embodiment.

FIG. 12 is a flow diagram illustrating that steps that may be performed in one embodiment when it is determined that the processing element's BTAC has been invalidated. This could occur for a variety of reasons, one example being where an interrupt is taken by the processing element. In particular, in one embodiment it is decided to invalidate the BTAC contents upon taking such an interrupt, so as to avoid the need to save all of that state prior to taking the interrupt, and hence allowing the interrupt to be handled more quickly. If at step 600 it is determined that the processing element's BTAC has been invalidated, then the processing element will notify the trace module 20 at step 605, whereafter at step 610 the trace module will in one embodiment issue an invalidation event packet within the trace stream. Upon receipt of such an invalidation event packet at step 615, the decompressor will then invalidate its decompressor BTAC contents.

In an alternative embodiment, there may be no need to separately issue an invalidation event packet within the trace stream, if the trace analyser is arranged to clear its local decompressor BTAC contents 115 when it processes another packet issued at this time within the trace stream. For example, in one embodiment an interrupt packet will be issued within the trace stream to indicate the presence of the interrupt. The trace analyser could be configured to know that the processing element's BTAC will be invalidated in such a situation, and hence can clear the decompressor BTAC contents directly as a result of receiving the interrupt packet, without any separate invalidation event packet being required.

Figure 13:
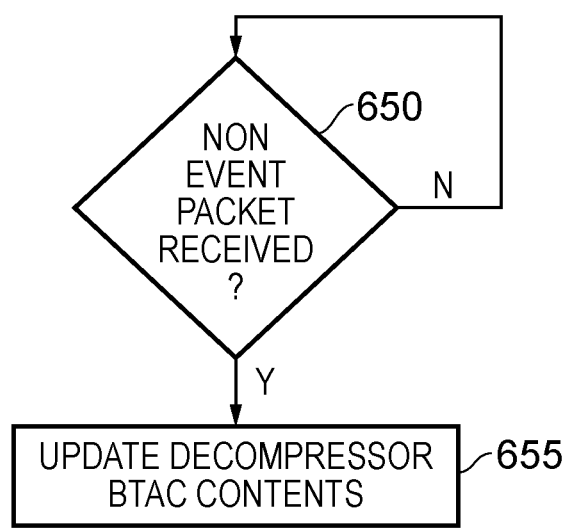
FIG. 13 is a flow diagram illustrating steps performed by the trace analyser upon receipt of a non-event packet within the trace stream, in accordance with one embodiment.

FIG. 13 schematically illustrates processing that may be performed at the decompressor circuitry in response to a non-event packet as discussed earlier. At step 650, it is determined whether a non-event packet has been received, and when such a non-event packet is received, the decompressor BTAC contents are updated at step 655. In particular, one of the BTAC entries will be invalidated in response to the non-event packet. In one particular embodiment, both the BTAC 55 and the decompressor BTAC 115 may only include a single entry, and hence it is immediately apparent which entry gets invalidated in response to the non-event packet. However, alternatively, both BTACs may have multiple entries, but with the decompressor circuitry being aware of the replacement policy used by the processing element, and hence it being deterministic as to which entry should be invalidated upon receipt of the non-event packet. Indeed, in some instances, the decompressor circuitry may be able to determine from other packets in the trace stream, situations where entries have been invalidated within BTAC 55 without any need to separately issue a non-event packet within the trace stream.

In an embodiment where the decompressor BTAC 115 only keeps entries for identified instructions of branch-future instructions, but does not maintain entries for identified instructions of ZOLE instructions, there is no need for the trace module 20 to issue a non-event packet when an entry in the processing element's BTAC 55 is overwritten if that overwritten content relates to the identified instruction of a ZOLE instruction.

In one embodiment, it is possible that trace will not be enabled for all portions of the instruction sequence. This means that there is a prospect that trace might be enabled between execution of the branch behaviour setting instruction and execution of the corresponding identified instruction. Considering the earlier example of zero overhead loops where the branch behaviour setting instruction is a ZOLE instruction, no specific action is needed since as discussed earlier the behaviour is the same from a trace perspective, irrespective of whether a branch is triggered by encountering the penultimate instruction in the program loop or not. In particular, the trace generation circuitry will issue an E atom at the end of each loop iteration (other than the final loop iteration), whether that is triggered by encountering the ZOLE instruction, or is triggered by encountering the penultimate instruction (i.e. the instruction just prior to the ZOLE instruction), as will be apparent from the earlier discussion of FIG. 7.

However, if trace is enabled between a branch-future instruction and encountering of the corresponding identified instruction, then because the execution behaviour of the branch-future instruction will not have been traced, the trace analyser needs to be provided with additional information to enable it to correctly be able to track the processing behaviour of the processing element. In order to do this, the process of FIG. 14 is performed in one embodiment.

At step 660, the trace module 20 determines whether trace is enabled at step 660, and then trace is enabled, it is then determined at step 665 if the instruction flow is currently between a branch-future instruction and an associated identified instruction. If not, no additional action is required, and the process ends at step 685. However, if it is, then at step 670 the trace module monitors the behaviour of the identified instruction when it is subsequently executed by the processing element. In particular, at step 675 it is determined whether a branch was taken when executing that identified instruction. If not, then no action is required, but otherwise an exception style packet is issued within the trace stream at 680, this explicitly identifying the address of the current instruction and the target address that was branched too.

Figure 14:
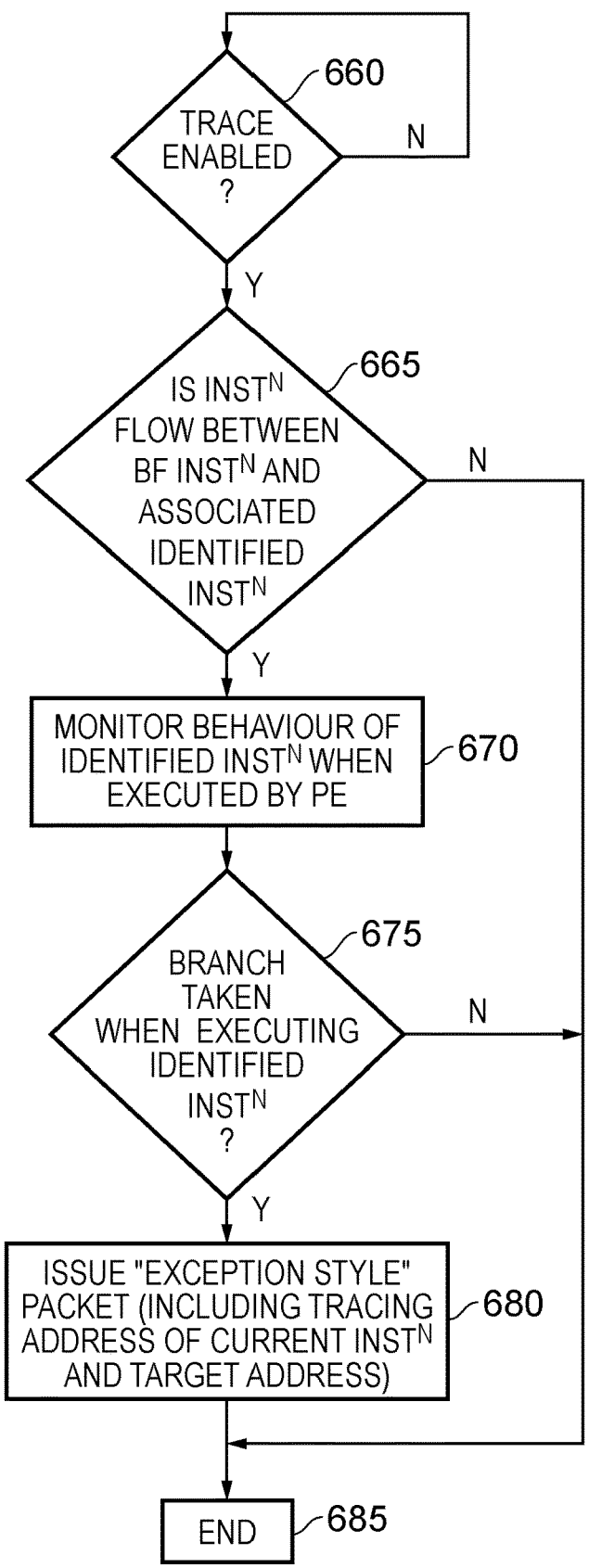
FIG. 14 is a flow diagram illustrating a sequence of steps performed by the trace module upon determining that trace has been enabled, in accordance with one embodiment.

There are a number of ways in which the behaviour of FIG. 14 can be implemented within the trace module 20. In one embodiment, the trace module is provided with counter circuitry 62 for maintaining a counter for each entry within the BTAC 55. In one particular embodiment, each counter takes the form of a saturating counter. FIG. 15 illustrates the process performed in relation to each counter. At step 700 it is determined whether a branch-future instruction is being traced to indicate that execution of that branch-future instruction caused the corresponding entry in the BTAC 55 to be populated (by issuing an E atom at step 475 when considering the embodiment shown in FIG. 9). Each time a branch-future instruction is traced in this way, the counter is incremented at step 705.

Similarly, at step 710, it is determined whether a branch has been taken in response to the identified instruction associated with the entry of the BTAC 55 having been encountered by the processing element, and if so the counter is subsequently decremented at step 715. Further, as indicated by step 720, if the BTAC is invalidated, for example on taking an interrupt, then the counter is cleared at step 725.

Assuming all instructions are considered for tracing, it will be appreciated that it would normally be expected that the counter would be non-zero when it is decided to take a branch for an identified instruction within an entry of the BTAC. For example, when considering the example embodiment discussed earlier at FIG. 9, at the point it is detected at step 482 that the current instruction is the instruction identified in the BTAC 55 by the associated branch-future instruction, the counter value will be non-zero, causing an E atom to be issued in the normal way at step 484. Performance of step 710 will then cause the counter to be decremented back to zero at step 715.

However, if the preceding branch-future instruction was not considered by the trace module (because the no path was followed from step 455 of FIG. 9 for example), then the counter will be zero at the time the branch is taken for the identified instruction that hits in the BTAC entry, and the presence of the zero counter can cause the process to proceed to step 680 in FIG. 14 to cause the exception style packet to be issued within the trace scream.

Figure 15:
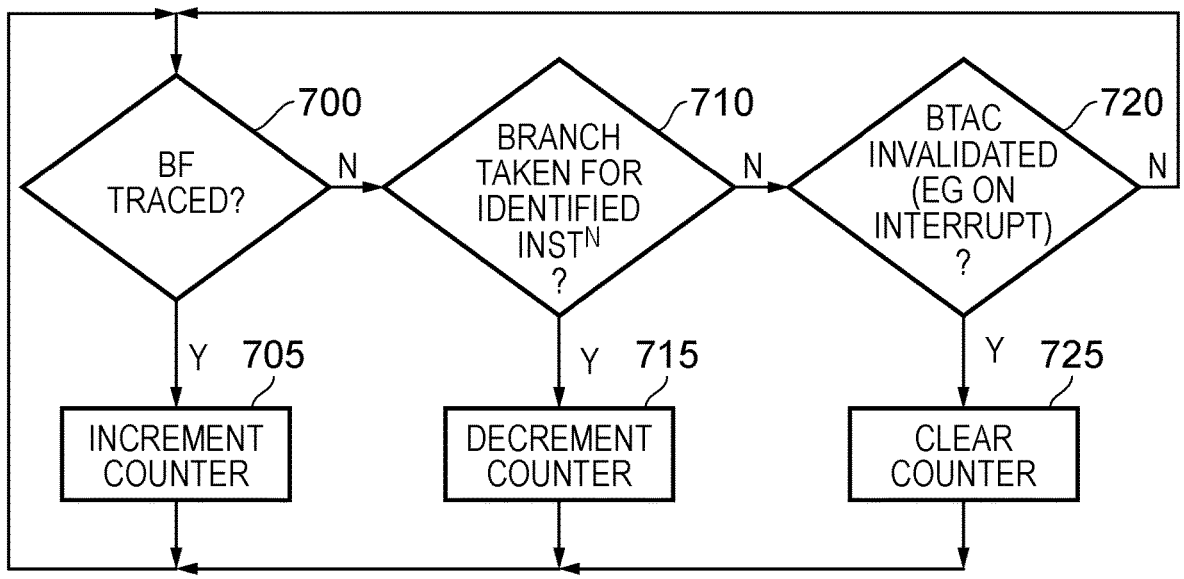
FIG. 15 is a flow diagram illustrating a saturating counter based implementation within the trace module that may be used to assess when an exception style atom needs to be issued in accordance with the method of FIG. 14.

Accordingly, by using the counter approach of FIG. 15, and maintaining a separate counter for each entry of the BTAC 55, the functionality of FIG. 14 can effectively be incorporated within the usual tracing behaviour. In particular, the process of FIG. 9 can be performed as usual but with the counter mechanism of FIG. 15 being employed in the background to keep counter values for each entry in the BTAC associated with a branch-future instruction. If at step 482 it is determined that the current instruction is one that is identified in the processing element's BTAC as associated with a branch-future instruction, then if the counter is non-zero an E atom will be issued at step 484, whereas if the counter value is zero an exception style packet will be issued.

The embodiments described herein enable a very efficient tracing mechanism to be implemented where trace elements are only produced for a (typically small) subset of the instructions that are actually executed by the monitored circuitry, but which can accurately trace the activities of the monitored circuitry even when the monitored circuitry executes an instruction sequence which includes one or more branch behaviour setting instructions, that can effectively convert an arbitrary instruction into a branch.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
an input interface to receive instruction execution information from processing circuitry indicative of a sequence of instructions executed by the processing circuitry, said sequence including a branch behaviour setting instruction that indicates an identified instruction within said sequence, execution of the branch behaviour setting instruction enabling a branch behaviour to be associated with said identified instruction that causes the processing circuitry to branch to a target address identified by the branch behaviour setting instruction when the identified instruction is encountered in said sequence; and
trace generation circuitry to generate from the instruction execution information a trace stream comprising a plurality of trace elements indicative of execution by the processing circuitry of instruction flow changing instructions within said sequence; and
the trace generation circuitry further being arranged to generate, from the instruction execution information, a trace element indicative of execution behaviour of said branch behaviour setting instruction, and a trace element to indicate that said branch behaviour has been triggered on encountering said identified instruction within said sequence.

2. An apparatus as claimed in claim 1, wherein:
when execution of the branch behaviour setting instruction causes the branch behaviour to be associated with the identified instruction, the processing circuitry is arranged to store branch control information for that identified instruction within a branch control storage; and
the trace generation circuitry is arranged to generate a trace element indicating that said branch behaviour has been triggered when the instruction execution information indicates that a branch has occurred due to the identified instruction being encountered in the sequence at a time where branch control information for that identified instruction is stored within the branch control storage.

3. An apparatus as claimed in claim 2, wherein:
the branch behaviour setting instruction is a loop-end instruction at a finish of a program loop body, the identified instruction is an immediately preceding instruction within said program loop body, and said target address is an address of an instruction at a start of the program loop body; and
the trace generation unit is arranged to issue a trace element indicating that said branch behaviour has been triggered each time the instruction execution information indicates that a branch has occurred due to said immediately preceding instruction being encountered at a time where branch control information for said immediately preceding instruction is stored within the branch control storage.

4. An apparatus as claimed in claim 3, wherein the branch behaviour is triggered when at least one further iteration of the program loop body is required when said immediately preceding instruction is encountered whilst branch control information for said immediately preceding instruction is stored within the branch control storage.

5. An apparatus as claimed in claim 3, wherein:
when execution of the loop-end instruction causes the branch behaviour to be associated with said immediately preceding instruction, the processing circuitry is arranged to branch to said target address, and the trace generation circuitry is arranged to issue a trace element indicating a taken branch as the execution behaviour of said loop-end instruction;
when no further iterations of the loop body are required, execution of the loop-end instruction will cause the processing circuitry to exit the program loop body, and the trace generation circuitry is arranged to issue a trace element indicating a not taken branch as the execution behaviour of said loop-end instruction.

6. An apparatus as claimed in claim 3, wherein:
when an event causes the branch control information for said immediately preceding instruction to be invalidated within the branch control storage whilst further iterations of the program loop body are still required, the branch behaviour will not be triggered on a next encountering of said immediately preceding instruction;

the processing circuitry is responsive to a next execution of the loop-end instruction to cause the branch behaviour to be re-associated with said immediately preceding instruction, and a branch to be taken to said target address, thereby resuming processing of the further iterations of the program loop body; and the trace generation circuitry is arranged to issue a further trace element indicating a taken branch as the execution behaviour of said loop-end instruction.

7. An apparatus as claimed in claim 1, wherein:

the branch behaviour setting instruction is a branch-future instruction, and the identified instruction is an instruction following said branch-future instruction within said sequence;

when execution of the branch-future instruction causes the branch behaviour to be associated with said identified instruction, the trace generation circuitry is arranged to issue a trace element indicating, as the execution behaviour of said branch-future instruction, that the branch behaviour has been associated;

when execution of the branch-future instruction does not cause the branch behaviour to be associated with said identified instruction, the trace generation circuitry is arranged to issue a trace element indicating, as the execution behaviour of said branch-future instruction, that the branch behaviour has not been associated.

8. An apparatus as claimed in claim 7, wherein:

the trace generation circuitry is arranged to issue, as the trace element indicating that the branch behaviour has been associated, a same type of trace element as used to indicate a taken branch; and the trace generation circuitry is arranged to issue, as the trace element indicating that the branch behaviour has not been associated, a same type of trace element as used to indicate a not taken branch.

9. An apparatus as claimed in claim 7, wherein:

when execution of the branch behaviour setting instruction causes the branch behaviour to be associated with the identified instruction, the processing circuitry is arranged to store branch control information for that identified instruction within a branch control storage;

the trace generation circuitry is arranged to generate a trace element indicating that said branch behaviour has been triggered when the instruction execution information indicates that a branch has occurred due to the identified instruction being encountered in the sequence at a time where branch control information for that identified instruction is stored within the branch control storage; and when execution of the branch-future instruction causes the branch behaviour to be associated with the identified instruction, and the branch control information for that identified instruction stored by the processing circuitry within the branch control storage overwrites active branch control information associated with the identified instruction of a previously executed branch-future instruction, the trace generation circuitry is arranged to issue a non-event trace element.

10. An apparatus as claimed in claim 7, wherein when tracing is enabled at a point in instruction execution between execution of the branch-future instruction and encountering of the identified instruction in said sequence, the trace generation circuitry is responsive to a branch being taken on encountering the identified instruction, to issue a trace element to identify both the identified instruction and the branch that has been taken on encountering that identified instruction.

11. An apparatus as claimed in claim 10, wherein:

when execution of the branch behaviour setting instruction causes the branch behaviour to be associated with the identified instruction, the processing circuitry is arranged to store branch control information for that identified instruction within a branch control storage;

the trace generation circuitry is arranged to generate a trace element indicating that said branch behaviour has been triggered when the instruction execution information indicates that a branch has occurred due to the identified instruction being encountered in the sequence at a time where branch control information for that identified instruction is stored within the branch control storage;

the trace generation circuitry is arranged to maintain a counter value in association with each entry in the branch control storage associated with an identified instruction of a branch-future instruction; and the trace generation circuitry is arranged to issue said trace element to identify both the identified instruction and the branch that has been taken on encountering that identified instruction, when the counter value for the relevant entry in the branch control storage has an unexpected value when the branch is taken on encountering the identified instruction.

12. An apparatus as claimed in claim 2, wherein:

when an event causes the branch control information within the branch control storage to be invalidated, the trace generation circuitry is arranged to issue an invalidation trace element.

13. An apparatus as claimed in claim 1, wherein the processing circuitry is arranged, when said branch behaviour is triggered on encountering said identified instruction within said sequence, to also execute said identified instruction.

14. An apparatus as claimed in claim 1, wherein the processing circuitry is arranged, when said branch behaviour is triggered on encountering said identified instruction within said sequence, to inhibit execution of said identified instruction.

15. An apparatus as claimed in claim 2, wherein said branch control information comprises at least branch point data providing an indication of said identified instruction and further data providing an indication of said target address.

16. An apparatus as claimed in claim 15, wherein said branch point data comprises one or more of:

address data indicative of an address of said identified instruction;

end data indicative of an address of a last instruction that immediately precedes said identified instruction;

offset data indicative of a distance between said branch behavior setting instruction and said identified instruction;

a proper subset of bits indicative of a memory storage address of said identified instruction starting from a least significant bit end of bits of said memory storage address that distinguish between starting storage addresses of instructions;

remaining size instruction data indicative of a number of instructions remaining to be processed before said identified instruction; and remaining size data indicative of a number of program storage locations remaining to be processed before said identified instruction is reached.

17. An apparatus, comprising:
an input interface to receive a trace stream comprising a plurality of trace elements indicative of execution by processing circuitry of predetermined instructions within a sequence of instructions executed by the processing circuitry, said sequence including a branch behaviour setting instruction that indicates an identified instruction within said sequence, execution of the branch behaviour setting instruction enabling a branch behaviour to be associated with said identified instruction that causes the processing circuitry to branch to a target address identified by the branch behaviour setting instruction when the identified instruction is encountered in said sequence;
decompression circuitry, responsive to each trace element, to traverse a program image from a current instruction address until a next one of the predetermined instructions is detected within said program image, and to produce from the program image information indicative of the instructions between said current instruction address and said next one of the predetermined instructions; and
a branch control storage associated with said decompression circuitry;
the decompression circuitry being responsive to detecting at least one type of the branch behaviour setting instruction when traversing said program image in response to a current trace element of a predetermined type, to store within the branch control storage branch control information derived from the branch behaviour setting instruction;
the decompression circuitry being arranged, when detecting with reference to the branch control information that the identified instruction has been reached during traversal of the program image, to treat that identified instruction as the next one of said predetermined instructions.

18. An apparatus as claimed in claim 17, wherein the decompression circuitry is arranged to store as the branch control information branch point data identified by the branch behaviour setting instruction and used to determine said identified instruction.

19. An apparatus as claimed in claim 18, wherein the decompression circuitry is further arranged to store as the branch control information the target address when that target address is directly derivable from an immediate value specified within said branch behaviour setting instruction.

20. An apparatus as claimed in claim 17, wherein:
the decompression circuitry is responsive to a non-event trace element in said trace stream to invalidate an entry in its associated branch control storage.

21. An apparatus as claimed in claim 17, wherein:
the decompression circuitry is responsive to an invalidation trace element in said trace stream to invalidate the contents of its associated branch control storage.

22. A method of generating a trace stream indicative of instruction execution by processing circuitry, comprising:
receiving instruction execution information from the processing circuitry indicative of a sequence of instructions executed by the processing circuitry, said sequence including a branch behaviour setting instruction that indicates an identified instruction within said sequence, execution of the branch behaviour setting instruction enabling a branch behaviour to be associated with said identified instruction that causes the processing circuitry to branch to a target address identified by the branch behaviour setting instruction when the identified instruction is encountered in said sequence;
generating from the instruction execution information the trace stream comprising a plurality of trace elements indicative of execution by the processing circuitry of instruction flow changing instructions within said sequence; and
generating, from the instruction execution information, a trace element indicative of execution behaviour of said branch behaviour setting instruction, and a trace element to indicate that said branch behaviour has been triggered on encountering said identified instruction within said sequence.

23. An apparatus comprising:
input interface means for receiving instruction execution information from processing circuitry indicative of a sequence of instructions executed by the processing circuitry, said sequence including a branch behaviour setting instruction that indicates an identified instruction within said sequence, execution of the branch behaviour setting instruction enabling a branch behaviour to be associated with said identified instruction that causes the processing circuitry to branch to a target address identified by the branch behaviour setting instruction when the identified instruction is encountered in said sequence; and
trace generation means for generating from the instruction execution information a trace stream comprising a plurality of trace elements indicative of execution by the processing circuitry of instruction flow changing instructions within said sequence; and
the trace generation means further for generating, from the instruction execution information, a trace element indicative of execution behaviour of said branch behaviour setting instruction, and a trace element to indicate that said branch behaviour has been triggered on encountering said identified instruction within said sequence.

24. A method of processing a trace stream generated to indicate instruction execution by processing circuitry, comprising:
receiving the trace stream comprising a plurality of trace elements indicative of execution by the processing circuitry of predetermined instructions within a sequence of instructions executed by the processing circuitry, said sequence including a branch behaviour setting instruction that indicates an identified instruction within said sequence, execution of the branch behaviour setting instruction enabling a branch behaviour to be associated with said identified instruction that causes the processing circuitry to branch to a target address identified by the branch behaviour setting instruction when the identified instruction is encountered in said sequence;
traversing, responsive to each trace element, a program image from a current instruction address until a next one of the predetermined instructions is detected within said program image, and producing from the program image information indicative of the instructions between said current instruction address and said next one of the predetermined instructions;
responsive to detecting at least one type of the branch behaviour setting instruction when traversing said program image in response to a current trace element of a predetermined type, storing within a branch control storage branch control information derived from the branch behaviour setting instruction; and when detecting with reference to the branch control information that the identified instruction has been reached during traversal of the program image, treating that identified instruction as the next one of said predetermined instructions.

25. An apparatus, comprising:

an input interface means for receiving a trace stream comprising a plurality of trace elements indicative of execution by processing circuitry of predetermined instructions within a sequence of instructions executed by the processing circuitry, said sequence including a branch behaviour setting instruction that indicates an identified instruction within said sequence, execution of the branch behaviour setting instruction enabling a branch behaviour to be associated with said identified instruction that causes the processing circuitry to branch to a target address identified by the branch behaviour setting instruction when the identified instruction is encountered in said sequence;

decompression means for traversing, responsive to each trace element, a program image from a current instruction address until a next one of the predetermined instructions is detected within said program image, and for producing from the program image information indicative of the instructions between said current instruction address and said next one of the predetermined instructions; and a branch control storage means for association with said decompression means;

the decompression means, responsive to detecting at least one type of the branch behaviour setting instruction when traversing said program image in response to a current trace element of a predetermined type, for storing within the branch control storage means branch control information derived from the branch behaviour setting instruction;

the decompression means, when detecting with reference to the branch control information that the identified instruction has been reached during traversal of the program image, for treating that identified instruction as the next one of said predetermined instructions.

* * * * *